(12) United States Patent
Garverick et al.

(10) Patent No.: US 8,299,844 B2
(45) Date of Patent: Oct. 30, 2012

(54) SYSTEM AND CIRCUITRY TO PROVIDE STABLE TRANSCONDUCTANCE FOR BIASING

(75) Inventors: Steven L. Garverick, Solon, OH (US); Xinyu Yu, San Jose, CA (US)

(73) Assignee: Case Western Reserve University, Cleveland, OH (US)

( * ) Notice: Subject to any disclaimer, the term of this patent is extended or adjusted under 35 U.S.C. 154(b) by 832 days.

(21) Appl. No.: 12/407,348

(22) Filed: Mar. 19, 2009

(65) Prior Publication Data

US 2009/0205436 A1 Aug. 20, 2009

Related U.S. Application Data

(63) Continuation-in-part of application No. 11/537,488, filed on Sep. 29, 2006, now Pat. No. 7,562,581.

(60) Provisional application No. 60/721,649, filed on Sep. 29, 2005.

(51) Int. Cl.
*H01L 35/00* (2006.01)
*G05F 1/625* (2006.01)
*G05F 3/26* (2006.01)
(52) U.S. Cl. .................................. 327/513; 327/538
(58) Field of Classification Search .................. 341/143; 327/513, 538
See application file for complete search history.

(56) References Cited

U.S. PATENT DOCUMENTS 6,484,818 B2 11/2002 Alft et al.
6,700,445 B2 3/2004 Venkatraman et al.

OTHER PUBLICATIONS

Green, J.A. et al., "Single-chip surface micromachines integrated gyroscope with 50/h Allan deviation," Solid-State Circuits, IEEE Journal of, vol. 37, No. 12, pp. 1860-1866, Dec. 2002.
McLaren A. et al., "Generation of accurate on-chip time constants and stable transconductances," Solid-State circuits, IEEE Journal of, vol. 36, No. 4, pp. 691-695, Apr. 2001.
Nicolson, S. et al. "Improvements in biasing and compensation of CMOS opamps," Circuits and Systems, 2004. ISCAS '04. Proceedings of the 2004 International Symposium on, pp. I-665-8 vol. 1, May 23-26, 2004.
B. Razavi, Design of Analog CMOS Integrated Circuits, pp. 378-379 and 393-393, Mcgraw-Hill Book Company, 2001.
Toygur, L. Ph.D Thesis, Case Western Reserve University, Jan. 2004.
Toygur, L. Ph.D. Thesis, Case Western Reserve University, Jan. 2004. Online date—Jun. 2004 on ProQuest.
Toygur, L. et al., "High-Temperature, Low-Power 8-MegΩ by 1.2-MegHz SOI-CMOS Transimpedance Amplifier for MEMS-Based Wireless Sensors." IEEE International SOI Conference. pp. 179-181. Oct. 2004.

*Primary Examiner* — Lisa Caputo
*Assistant Examiner* — Punam Roy
(74) *Attorney, Agent, or Firm* — Tarolli, Sundheim, Covell & Tummino LLP

(57) ABSTRACT

An amplifier system can include an input amplifier configured to receive an analog input signal and provide an amplified signal corresponding to the analog input signal. A tracking loop is configured to employ delta modulation for tracking the amplified signal, the tracking loop providing a corresponding output signal. A biasing circuit is configured to adjust a bias current to maintain stable transconductance over temperature variations, the biasing circuit providing at least one bias signal for biasing at least one of the input amplifier and the tracking loop, whereby the circuitry receiving the at least one bias signal exhibits stable performance over the temperature variations. In another embodiment the biasing circuit can be utilized in other applications.

19 Claims, 19 Drawing Sheets

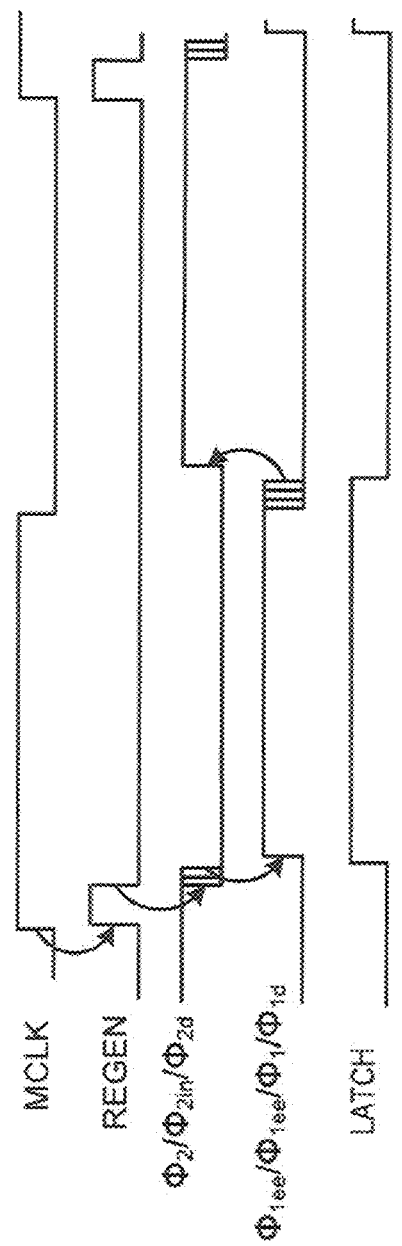

SYSTEM AND CIRCUITRY TO PROVIDE STABLE TRANSCONDUCTANCE FOR BIASING

CROSS-REFERENCE TO RELATED APPLICATIONS

This application is a continuation-in-part of U.S. patent application Ser. No. 11/537,488, which was filed on Sep. 29, 2006 now U.S. Pat. No. 7,562,581 and entitled WIRELESS SENSOR PLATFORM FOR HARSH ENVIRONMENTS, and which claims the benefit of provisional patent application No. 60/721,649 filed Sep. 29, 2005, each of which prior applications is incorporated herein by reference in its entirety.

GOVERNMENT RIGHTS

This application is made with government support under NCA3-201 awarded by NASA—Glenn Research Center. The United States Government has certain rights in this invention.

BACKGROUND

Various applications, ranging from small to large, simple to complex, use sensors to monitor certain aspects of an environment. For instance, sensors can detect motion in a room to determine whether its ceiling lights should be turned on. Likewise, sensors can be applied to more complex applications, including engine and vehicle control for automotive and aerospace systems, as well as environmental monitoring in mining, geothermal, and well logging. Accordingly, a wide variety of users (e.g., consumers, scientists, and engineers) regularly depend on the consistency and accuracy of sensor data collection and transmission. With the proliferation of technology in control systems, the importance of reliable monitoring and sensing platforms is apparent.

In particular, commercial, industrial, and military applications rely on sensors to provide data relating to safety conditions, travel speeds, and warning signals. While a household or office environment may be fairly easy to monitor, an operating automotive or aerospace system is considerably more difficult to work with. Complications that include temperature, distance, and power considerations distort the signals that the sensors need to monitor. In general, sensors for commercial applications are rated for temperatures as high as 70° C., industrial applications at 85° C., and military applications at 125° C.

While slight distortions may not adversely impact the entire system, severe distortions may flag a false signal (or fail to flag an existing signal) which in turn can expose people to dangerous situations. When sensors fail to properly perform, the resulting effect may be at the least, inconvenient, and at the most, life threatening. For example, if a motion detecting sensor fails to signal the lights on in a room, a person in the room would merely be inconvenienced into walking over to the wall to manually flip the light switch on. Meanwhile, if an automobile brake sensor fails to activate the anti-lock braking system while the vehicle is traveling at high speeds, the car could spin out of control and put the driver and passengers (along with others in the vicinity) in severe danger.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

One embodiment provides an amplifier system that includes an input amplifier configured to receive an analog input signal and provide an amplified signal corresponding to the analog input signal. A tracking loop is configured to employ delta modulation for tracking the amplified signal, the tracking loop providing a corresponding output signal. A biasing circuit is configured to adjust a bias current to maintain stable transconductance over temperature variations, the biasing circuit providing at least one bias signal for biasing at least one of the input amplifier and the tracking loop, whereby the circuitry receiving the at least one bias signal exhibits stable performance over the temperature variations.

Another embodiment of the invention provides a bias generator for providing adaptive bias control that provides stabilization of transconductance over temperature for associated circuitry. The bias generator includes a first arrangement of transistors that is configured as a first current mirror portion, the first current mirror portion being connected to a first reference voltage. A second arrangement of transistors and a resistor is configured as a second current mirror portion having a non-linear characteristic to provide a bias current through the resistor that is inversely proportional to mobility. The first current mirror is connected with the second current mirror portion between the first voltage reference and a second voltage reference and being arranged in a feedback relationship to stabilize the bias current through the resistor. A bias voltage is provided from at least one of the first current mirror portion and the second current mirror portion based on the bias current.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

BRIEF DESCRIPTION OF THE DRAWINGS

FIG. 13C is an example timing diagram of various clock phases provided by the clock generator of FIG. 12.

DETAILED DESCRIPTION

Figure 1:
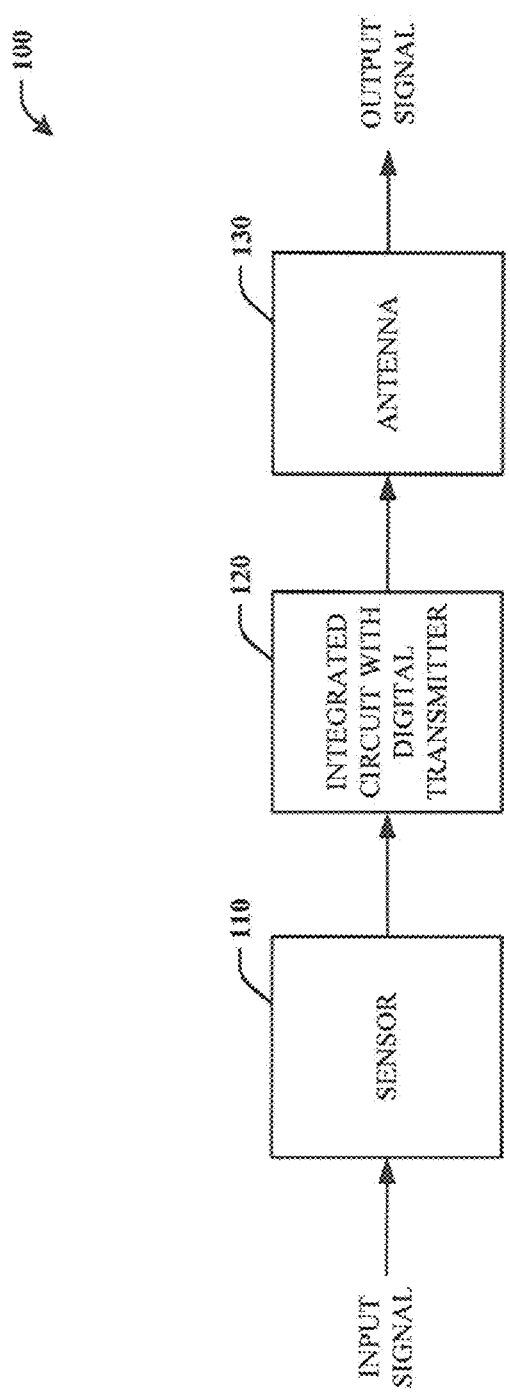
FIG. 1 is a block diagram of a wireless sensor module.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

In FIG. 1, a block diagram of a high-temperature, low power sensor module 100 that facilitates reliable sensing in harsh environments is illustrated. The sensor module 100 comprises a sensor 110 that retrieves information from an environment, an integrated circuit with digital transmitter 120 that performs signal processing, including amplification, conversion, and filtering, and an antenna 130 that communicates the resulting output signal to a receiver. The sensor 110 receives an analog input signal to be processed by the integrated circuit 120. The sensor may be resistive, capacitive, or a combination of the two. Regardless of which type of sensor is implemented, the AC admittance of the sensor can be recovered by the amplifier through conventional digital demodulation of the signal. More specifically, the integrated circuit 120 amplifies the received analog signal, converts the signal into digital form, and filters the resulting digital signal. Such signal is output by a digital transmitter as part of the integrated circuit 120 and antenna 130 so that it may be received wirelessly by a receiver. One advantage of wireless implementation is the absence of tangled wires, especially for rotating systems such as automotive wheels. Another advantage is a less restricted range in distance from which the module can operate.

Figure 2:
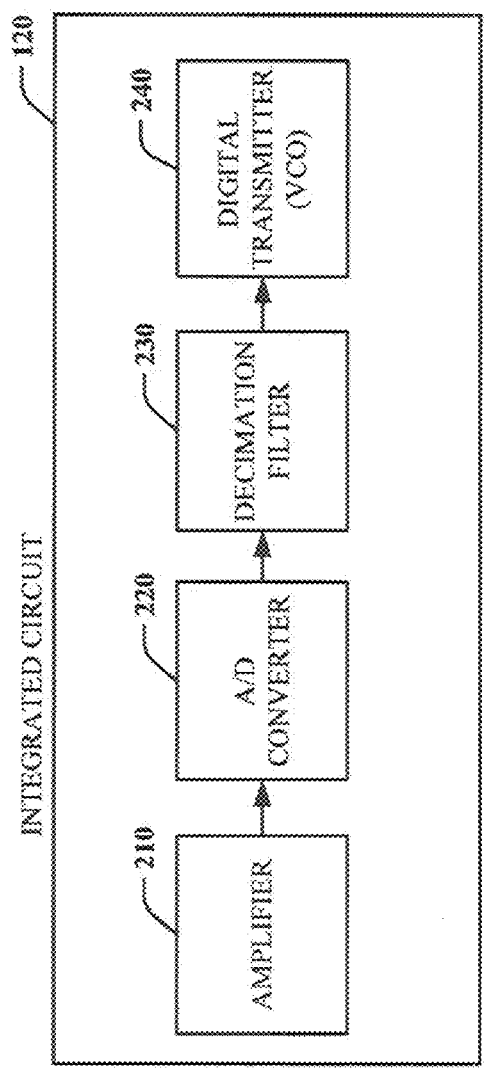
FIG. 2 is a block diagram of an integrated circuit used in a wireless sensor module.

FIG. 2 depicts a block diagram of an integrated circuit 120 that facilitates amplification, conversion, filtering, and transmitting of an input signal. The integrated circuit 120 comprises an amplifier 210, such as an SOI-CMOS transimpedance amplifier, that amplifies the input signal. The SOI-CMOS transimpedance amplifier 210 has a low input resistance suitable to receive data from MEMS-based high-impedance capacitive sensors. Such type of wide-gain-bandwidth amplifier can also act as a stable oscillator by counteracting the series resistance of a resonant device. As a result, the amplifier provides a gain greater than 2 MΩ and a bandwidth greater than 0.3 MHz for temperatures up to 300° C.

The integrated circuit 120 also comprises an A/D converter 220, such as an SOI-CMOS $1^{st}$-order sigma-delta A/D converter, that converts the received analog input signal into digital format. The SOI-CMOS $1^{st}$-order sigma-delta A/D converter 220 is capable of high-temperature performance with imprecise components using fully differential switched-capacitor circuits plus dynamic element matching, dithering, and chopper stabilization. The binary output of the comparator results in quantization error. However, the output tracks the input and reduces the error by the oversampling ratio, and the signal proceeds through a low-pass decimation filter 230 that removes the quantization error. Further included in the integrated circuit 120 is a digital transmitter (i.e., voltage-controlled oscillator) 240. The digital FSK (frequency shift keying) transmitter 240 facilitates propagation through harsh environments through the selection of a relatively low carrier frequency and corresponding longer wavelength. A loop antenna (not shown) serves as an inductor and combines with the capacitance of a tunnel diode and PMOS varactor to form a tank circuit. The wireless transmission of data can then be sent to a receiver for further evaluation or processing. Overall, the integrated circuit 120 facilitates the process of amplifying an analog signal, converting the analog signal to digital form, and filtering the digital signal to remove errors.

The SOI-CMOS transimpedance amplifier 210 can serve a dual purpose: to acquire data from MEMS-based impedance sensors and to construct an oscillator using a MEMS resonator. The amplifier 210 functions while maintaining a wide gain-bandwidth at all temperatures (e.g., up to about 300° C.), sustaining low power consumption (e.g., under about 1 mW), and utilizing a small die area (e.g., about 8500 $\mu m^2$ or less).

The sigma-delta A/D converter 220 receives an amplified analog signal from the amplifier 210, converts the signal from analog to digital format, and sends a digitally converted signal to the decimation filter 230. The A/D converter 220 achieves a high SNR (signal to noise ratio) while drawing a low level of static power. In one example, at room temperature the A/D converter 220 achieves an SNR above 50 dB while drawing 1.32 mW from a 3.3 V power supply. In another example, at temperatures greater than 250° C., the A/D converter 220 achieves an SNR above 40 dB while drawing less than 2 mW, also from a 3.3 V power supply. After the signal conversion, the decimation filter 230 receives the digital signal from the A/D converter 220 and proceeds by removing the quantization error introduced by the A/D converter, through low-pass filtering. The digital transmitter 240 is essentially a voltage-controlled oscillator and wirelessly transmits the digital signal via the loop antenna.

Figure 3:
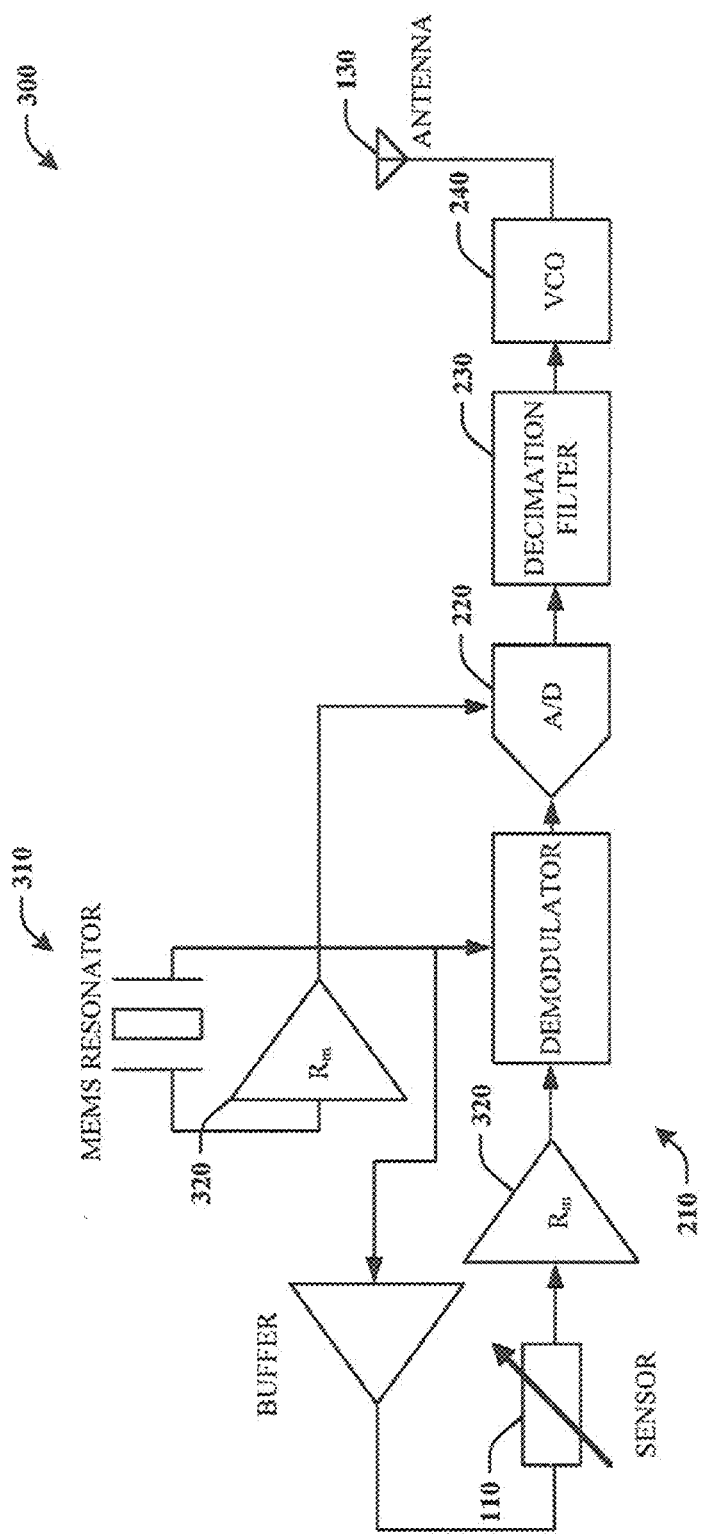
FIG. 3 is a schematic block diagram of a wireless sensor module.

In FIG. 3, a schematic block diagram of a wireless sensor module 300 is presented. The sensor module 300 comprises a sensor 110 that collects information from an environment and two instances of the transimpedance amplifier 210 (an oscillator 310 and a sensor interface amplifier 210) that provides for amplification. The wireless sensor module 300 also includes a sigma-delta A/D converter 220 that manages conversion of an analog signal to digital form and a decimation filter 230 that removes errors from the resulting digital signal. The wireless sensor module also includes an FSK transmitter/voltage-controlled oscillator 240 that provides transmission assistance in harsh environments, and an antenna 130 that broadcasts the signal transmission.

First, the sensor 110 receives an analog signal. One instance of the amplifier 320 is used in conjunction with a MEMS resonator to construct the oscillator 310. The second instance of the amplifier 320 is used in a synchronous detection scheme to measure sensor impedance 210. The amplifier 320 can be used to counteract the series resistance of a resonant device to form a stable oscillator 310, through a design that provides the gain and bandwidth necessary to construct high-temperature high-Q integrated oscillators 310, such as by using SiC MEMS lateral and vertical resonators having motional resistance (or equivalent series resistance at natural resonance thereof) that is over 1 MΩ and resonant frequencies as high as 1 MHz. The sensor interface amplifier 210 is able to acquire data from high-impedance sensors (e.g., MEMS capacitive sensors) and can recover the AC admittance of the sensor 110 via synchronous demodulation with in-phase and/or a quadrature reference signal, regardless of whether the sensor is resistive, capacitive, or a combination.

The analog signal is then converted into digital form by the A/D converter 220 and filtered by a low pass decimation filter 230. The resulting digital signal is transmitted by the FSK transmitter (essentially a voltage-controlled oscillator operated with binary input) 240 and antenna 130.

Figure 4:
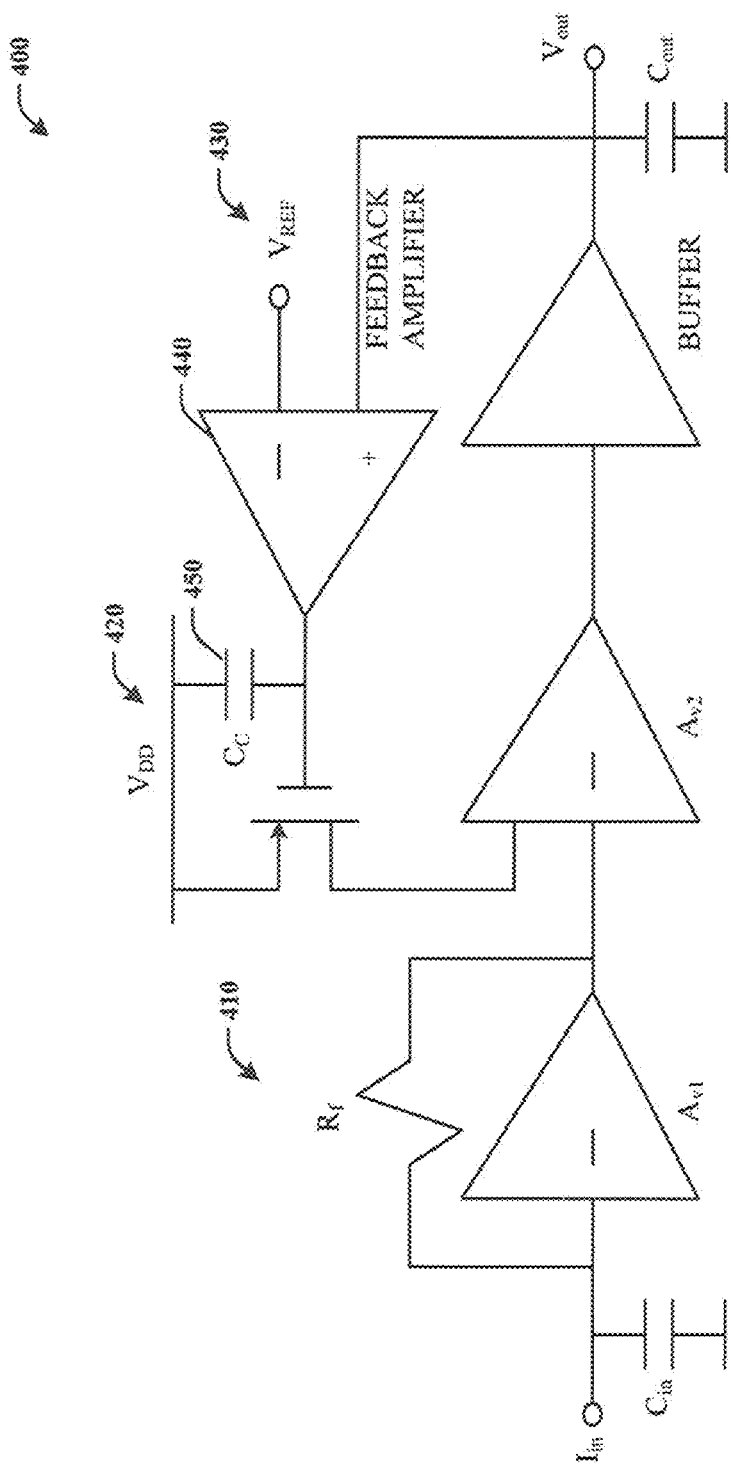
FIG. 4 is a schematic block diagram of a transimpedance amplifier.

FIG. 4 illustrates a schematic block diagram of an amplifier 400 that amplifies an analog input signal. The transimpedance amplifier 400 employs a three-stage topology 410, 420, and 430 that features feedback biasing 440 and a Class AB output stage 430. Class AB is defined by a proportion of 50-100% of the input signal cycle is used to actually switch on the amplifying device in the output stage 430. A very large, positive, transresistance gain was achieved using a simple inverting transimpedance stage 410 followed by an open-loop common-source voltage amplifier stage 420. The Class AB output stage 430 provides unity gain and low output impedance. The output is supplied to a feedback bias amplifier 440 that stabilizes the operating point of the second stage 420. The transresistance gain of the first stage 410, $R_f$, is made as large as possible, but is limited by the requirement for low input impedance:

$$R_{in} \approx R_f/A_{v1}$$

where $A_{v1}$ is the open-loop gain of the first stage amplifier 410. The overall transresistance gain of the amplifier 400 is approximately $R_m = A_{v2} * R_f = A_{v2}/g_{m4}$.

The input of the transimpedance amplifier should be less than the impedance of parasitic capacitance at the input, $C_{in}$, in order to avoid excessive loss of signal at the desired operating frequency of 1 MHz. In order to facilitate biasing of the second stage 420, and to reduce die area, $R_f$ was implemented using a source follower stage having a transconductance of $g_{m4}=10$ μS to achieve a small-signal resistance 100 kΩ. Since the amplitude of the first stage output 410 is less than 10 mV, this implementation has acceptable linearity.

The bandwidth of the feedback biasing loop, and therefore the low-frequency cutoff of the signal path, is set by the transconductance of the feedback amplifier 440, the compensation capacitor $C_{C\ 450}$, and the voltage gain of the cascode bias circuit used by the second stage 420. In one instance, the transconductance of the feedback amplifier 440 has been made relatively large such that an off-chip capacitor of a convenient value such as 100 nF can be used to customize the low-frequency cutoff of the signal path. However, $C_{C\ 450}$ could be integrated by using a low-$g_m$ feedback amplifier. In one embodiment, the compensation capacitor $C_C$ can be implemented as a single off-chip capacitor, whereas the remaining circuitry of the amplifier 400 is integrated on-chip.

Figure 5:
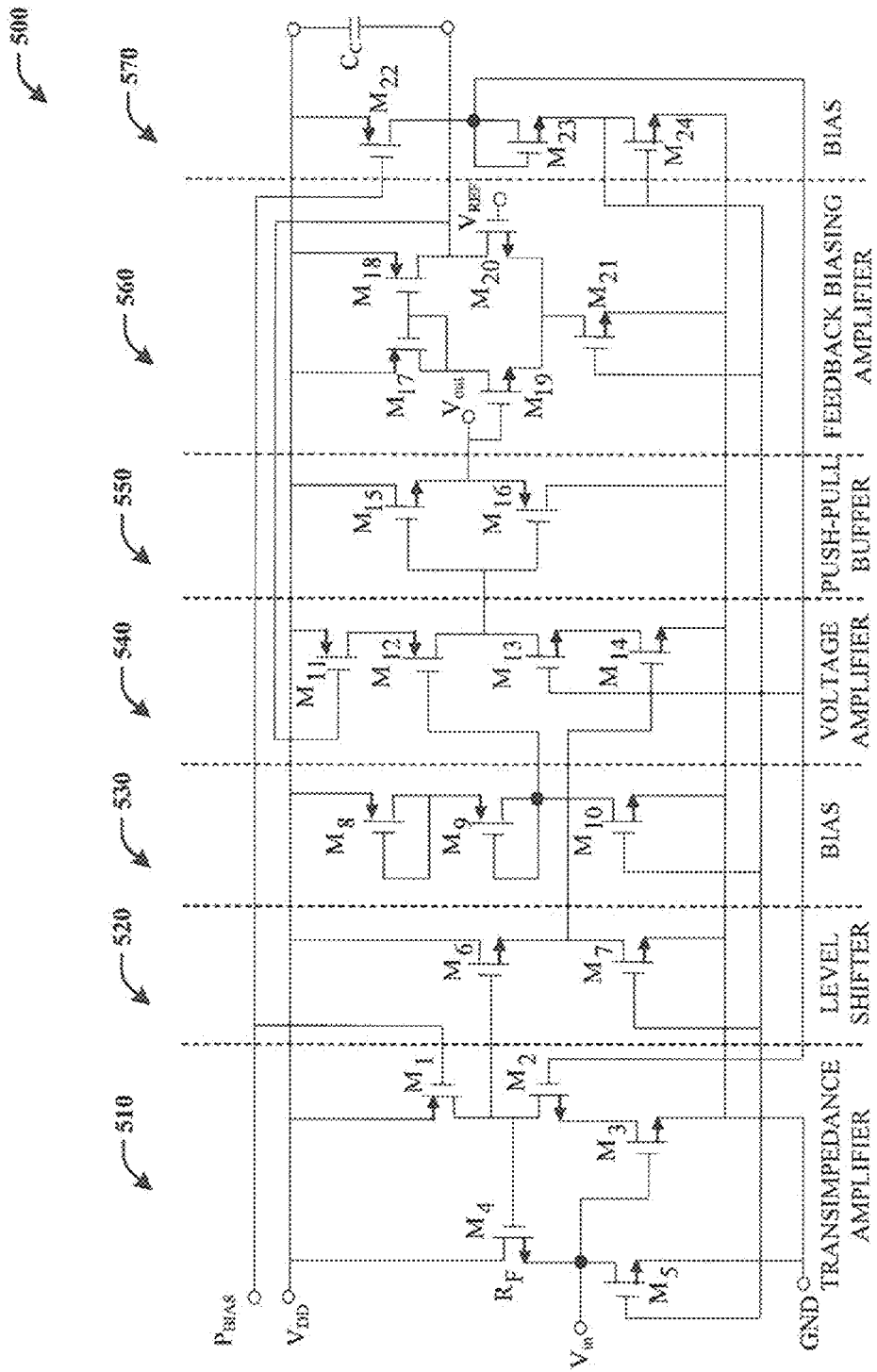
FIG. 5 is a transistor level circuit schematic of a transimpedance amplifier.

Turning to FIG. 5, a transistor level circuit schematic of an amplifier 500 that amplifies the initial input signal is presented. The labels M1 through M24 in the schematic refer to transistors. The circuit schematic 500 is comprised of various stages, namely the transimpedance amplifier 510, level shifter 520, bias 530, voltage amplifier 540, push-pull buffer 550, feedback biasing amplifier 560, and bias 570.

The first (M1-M3) 510 and second (M11-M14) 540 stages employ cascoded common-source stages to improve voltage gain. A source-follower level-shifter (M6-M7) 520 is inserted between the first 510 and second 540 stages in order to minimize capacitance loading on the first stage 510 and to establish the necessary bias voltage for the second stage 540 input.

The output resistance of the first stage 510 is dominated by the output resistance of M1, $r_{o1}$, since the resistance due to the M2-M3 cascode is much larger. Therefore, $A_{v1}$ is approximately $g_{m3}r_{o1}$, which is proportional to L1, the channel length of M1. L1 is made relatively large to obtain high voltage gain, but is limited by the need to obtain a resistance that is low enough to obtain a satisfactory non-dominant pole frequency in the first stage 510 feedback loop.

The Class AB output stage (M15-M16) 550 employs a simple push-pull configuration that takes advantage of the near-zero-threshold transistors that are available in the process technology. Accordingly, the push-pull buffer does not exhibit the cross-over distortion that is typical for this configuration. Bias current in this stage is sensitive to process variations, but variation is within tolerable limits and the simple implementation has high bandwidth and low power dissipation. Reference voltage $V_{DD}$ and bias voltage $P_{BIAS}$ are provided, for example, by an on-chip bandgap-voltage reference circuit, and cascode bias voltages are generated within the transimpedance amplifier 500.

Transistors with near-zero-threshold voltage may be used to minimize the supply voltage. Alternatively, current mirrors can be designed using transistors with larger room-temperature threshold voltages since the threshold voltages of enhancement devices shift toward zero at elevated temperatures, ultimately causing depletion-mode behavior and degrading the desired behavior of diode-connected transistors.

Figure 6:
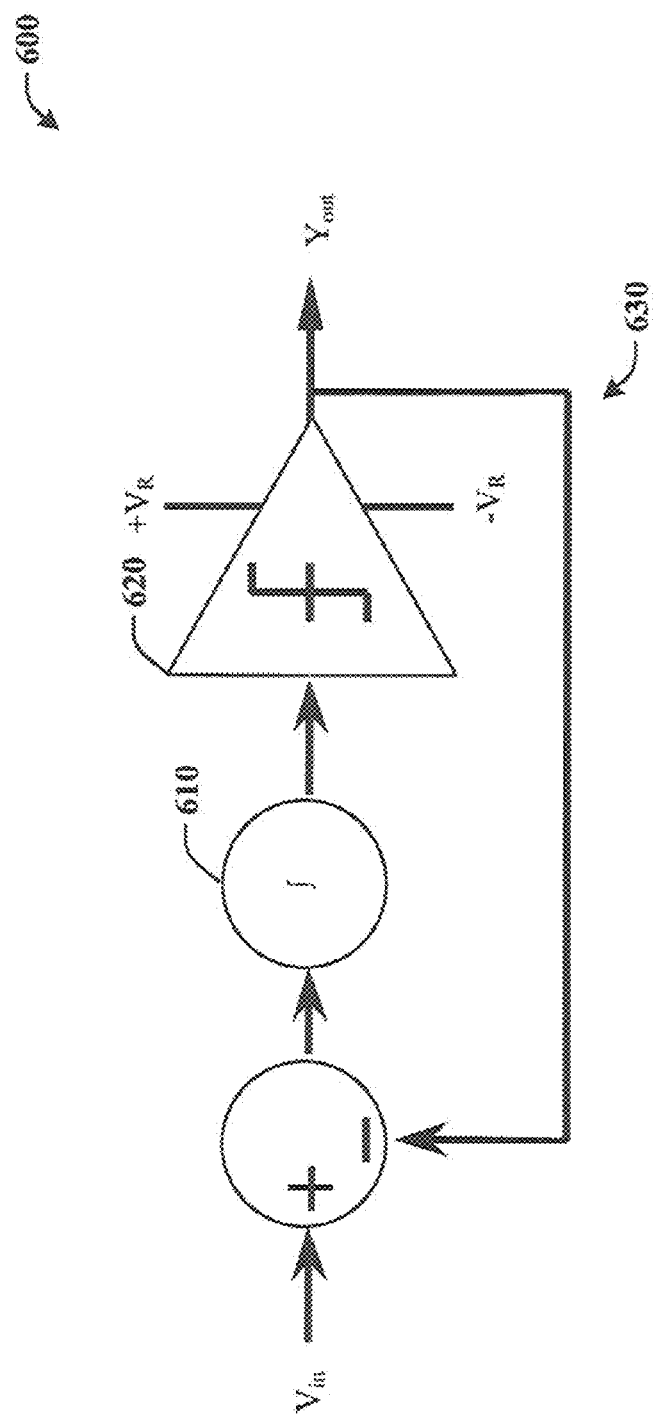
FIG. 6 is a block diagram of a $1^{st}$-order sigma-delta A/D converter.

Continuing to FIG. 6, a block diagram of an A/D converter 600 that manages the conversion of the analog input signal into digital form is depicted. The block diagram of a $1^{st}$-order ΣΔ A/D converter 600 includes an integrator 610 and comparator 620 in a feedback configuration 630. Two-level quantization is performed through the use of a comparator 620, resulting in quantization error. Since the low-frequency gain of the integrator 610 is very large, the output tracks the input 630 and the non-idealities from quantization are reduced by the oversampling ratio.

Figure 7:
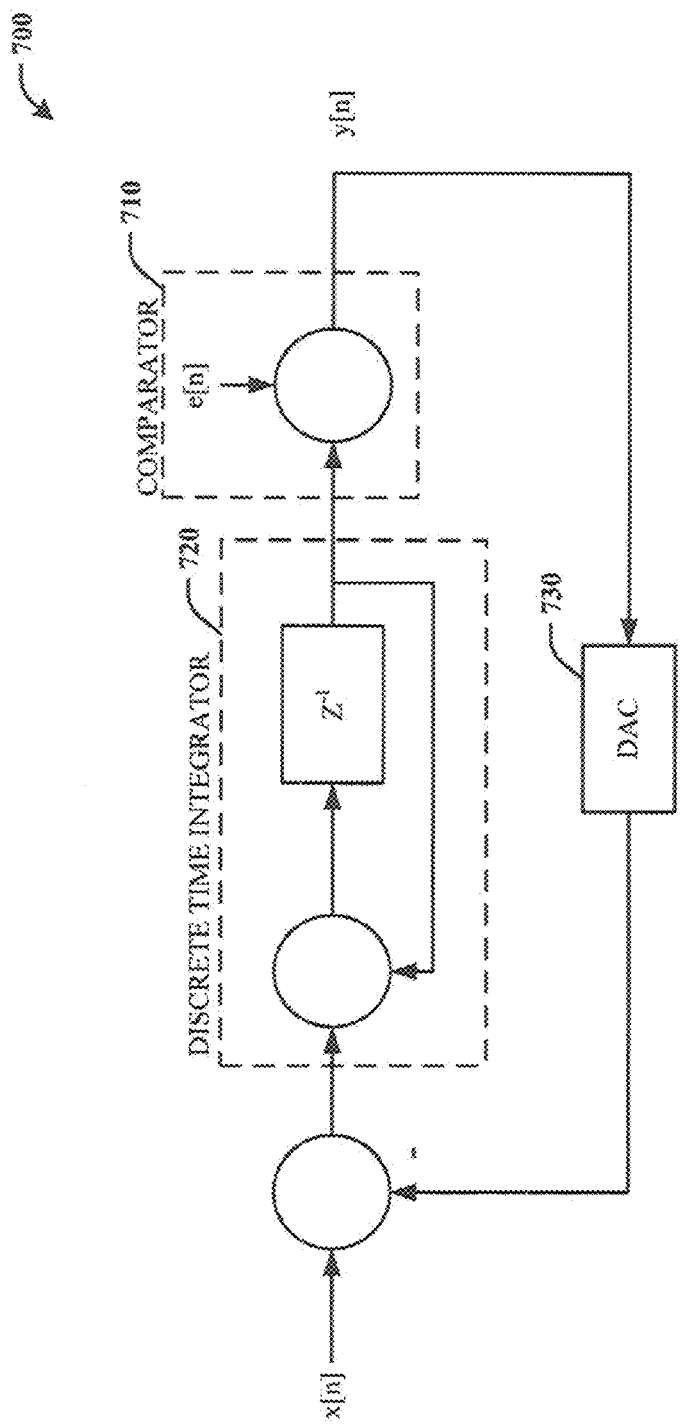
FIG. 7 illustrates a discrete-time model of a 1.sup.st-order sigma-delta A/D converter.

FIG. 7 depicts one embodiment of a discrete-time model of an A/D converter 700. The discrete-time model of the ΣΔ A/D converter is illustrated by a discrete time integrator 710, comparator 710, and D/A converter 730. Where e[n] represents quantization error introduced by the comparator, the output y[n] is a delayed version of the input plus the difference of two e[n] samples: y[n]=x[n−1]+(e[n]−e[n−1]) The quantization error is thus pushed away from the signal band and can subsequently be removed by digital low-pass filtering. Given a goal of 8b resolution and a signal bandwidth of 16 kHz, a sampling rate of 1 MHz may be selected to provide an oversampling ratio of 64. A full-scale reference voltage of ±1.8 V may be generated using an on-chip self-biased reference circuit, and integrator gain may be set to ½ to avoid integrator saturation.

Figure 8:
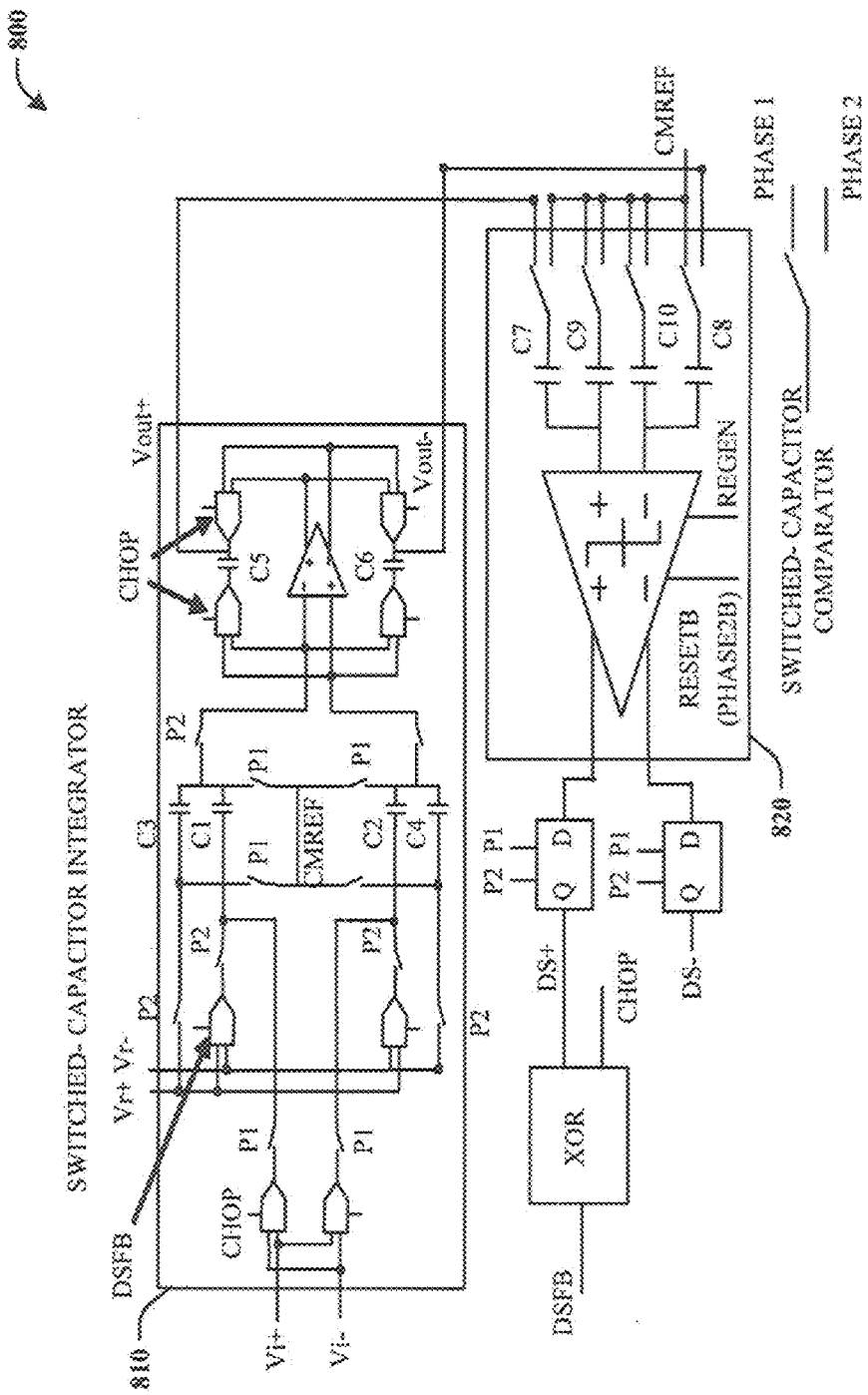
FIG. 8 is a schematic block diagram of a 1.sup.st-order sigma-delta A/D converter incorporating chopper stabilization, dynamic element matching, and input dither.

FIG. 8 shows an embodiment of a schematic block diagram of an A/D converter 800. The label "P1" refers to phase 1, the label "P2" refers to phase 2, and the label "CHOP" refers to a chopping signal. The converter 800 includes a switched-capacitor integrator 810 and a switched-capacitor comparator 820, which are fully differential. Although power consumption for a given thermal noise is increased in comparison to a single-ended topology, power supply and common mode rejection are much improved, and charge injection effects can be much more easily managed.

A chopping signal "CHOP" is generated at 1/64 of the sampling clock and used to perform dynamic element matching by swapping C1-C2, to add a dither of $V_R/16$ using C3-C4, and to stabilize the integrator operational amplifier by swapping C5-C6. The comparator 820 is offset-cancelled by chopper stabilization using C7-C10. The integrator 810 uses a folded cascode operational amplifier that is biased using a common-mode feedback loop. A bottom-plate sampling scheme is used to minimize charge injection and capacitance on the summing node.

Figure 9:
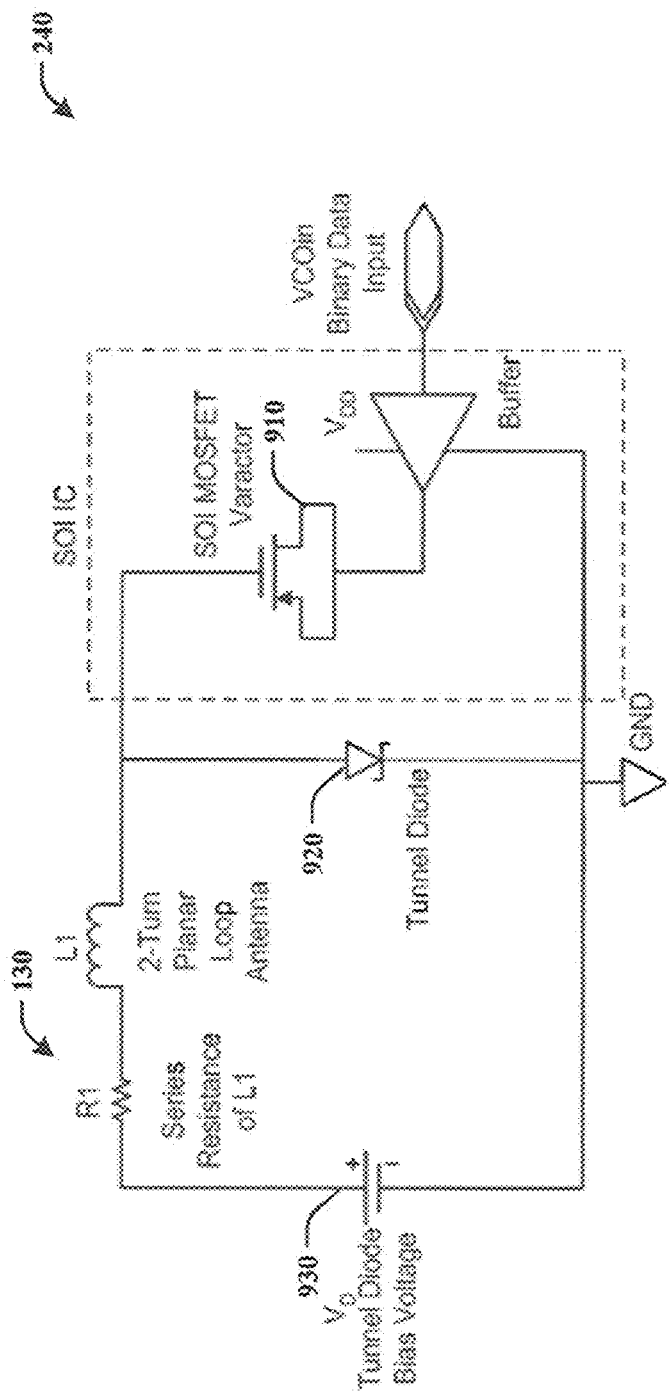
FIG. 9 is a circuit schematic of a digital FSK transmitter.

FIG. 9 illustrates an example embodiment of a circuit schematic of a digital FSK transmitter 204. The transmitter can operate with low power in high-temperature environments. The transmitter 240 includes an SOI MOS varactor 910. A binary input at 912 is provided to a buffer 914, which drives an input of the varactor 910. The varactor 910 thus exhibits a variable capacitance depending on the voltage provided by the buffer 912. The varactor and buffer can be integrated in an SOI chip. A Si tunnel diode 920 is connected between the cathode of the varactor 910 and ground. A planar loop antenna 130 is also coupled to the cathode of the varactor 910, and a tunnel diode bias voltage 930 is coupled between the planar loop antenna 130 and ground. As an example, a two-turn, 250 nH planar loop antenna 130, having an inductance L1 and series resistance R1, can serve as an inductor that combines with the capacitance of the tunnel diode 920 and PMOS varactor 910 to form a tank circuit, resonating at about 27 MHz. This relatively low carrier frequency was chosen primarily for its long wavelength and ability to propagate through harsh environments (e.g., engine compartments) of high conductivity. This band provides 326 kHz bandwidth of low-interference spectrum for low-power communications and allows for a data rate of approximately 80 kbps with FSK—adequate for most sensor applications.

The tunnel diode bias voltage 930 biases the tunnel diode 920, for example, with a bias of about 0.21 V and 1.75 mA. The biasing from the bias voltage 930 thus can operate the tunnel diode 920 to provide a negative resistance that compensates for losses in the LC tank circuit in order for oscillations to be sustained. When the binary (digital) input switches from low to high, the varactor 910 switches from depletion to inversion with a three-times measured change in its capacitance. This results in a significant and reliable shift in oscillation frequency for the transmitter 240 according to the digital input signal received at 912.

Such numerical ranges and biases may be adjusted as desired for a specific situation or application. The FCC ISM (industrial, scientific, medical) frequency band, located mainly at low frequencies (i.e., less than 50 MHz) and high frequencies (i.e., above 1 GHz), was utilized to avoid potential interferences. In consideration of this specific embodiment, the lowest ISM frequency consistent with the desired data rate (i.e., 80 kbps) was selected. Various digital modulation choices include ASK (amplitude shift keying), PSK (phase shift keying), and FSK (frequency shift keying), via binary-modulation or M-ary modulation. In one implementation, BFSK (binary frequency shift keying) was selected to reduce the required amplitude resolution in the demodulator and provide a simple and efficient implementation.

As opposed to ASK, FSK is not highly sensitive to amplitude noise—such consideration is relevant in this implementation. In terms of signal quality, spectral efficiency, and power efficiency, the following comparison summarizes BFSK and BPSK performance.

|  | BFSK | BPSK |
| --- | --- | --- |
| BER | $P_{e,BFSK} = Q\left(\sqrt{\frac{E_b}{N_0}}\right)$ | $P_{e,BPSK} = Q\left(\sqrt{\frac{2E_b}{N_0}}\right)$ |
| Spectral efficiency | $BW = 2f_b + \Delta f$ | $BW = 2f_b$ |
| Power efficiency | Good | Poor |

Signal quality is expressed in terms of BER (bit error rate), which is the probability of error in the presence of noise and other interferences. As shown above, BER is a function of energy per bit $E_b$, noise $N_0$, and probability of error $Q(x)$, assuming the received signal is corrupted by additive white noise. $E_b$ can be written as $E_b = AA_c^2 T_b/2$ where $T_b$ is the bit duration, $1/T_b$ is the bit rate $f_b$, $A_c$ is the amplitude of the modulated signals. $Q(x)$ in an FSK system is given by:

$$Q(x) = 1/2 \, \text{erfc}\left(\frac{x}{\sqrt{2}}\right)$$

where erfc is the complementary error function. The BER can be lowered by increasing the signal power or decreasing the data rate. Note that the transmit power can be 3 dB lower in BPSK than BFSK for the same BER.

BPSK occupies twice of the bit rate, $2 f_b$, while BFSK depends on the bit rate $f_b$ and the frequency spacing $\Delta f$ that separates a logic 0 from a logic 1. Frequency deviation $\Delta f$ can be as low as $0.5 f_b$, but $2 f_b$ provides robust communication. If $\Delta f$ is $2 f_b$, the total spectrum occupied by BFSK spreading is $4 f_b$, twice that required by BPSK. Nevertheless, BFSK may be used in low data rate applications where $E_b$ can be maximized by a long bit period.

The FSK technique has better power efficiency performance than PSK since the FSK signal has no abrupt phase change and does not require "spectral regrowth" to smooth the waveform. Accordingly, FSK has a better adjacent channel power ratio, while PSK requires a more complicated circuit to achieve similar performance.

The planar loop antenna 130 may be implemented using a gold-on-ceramic module suitable for high-temperature applications. Considering the transmission distance in short range, the antenna operates in the near field (r<<wavelength) by induction. With the goal of 2.58 cm diameter, the square loop was selected to maximize the area because radiation power is proportional to the square of loop area. For example, a 2-turn, square-shape loop having 2.58 cm side length (diameter) planar loop antenna 130 may be employed to increase the radiation power.

The varactor 910 is SOI MOS fabricated using the Peregrine UTSi 0.5 μm process. The MOS capacitance consists of overlap capacitance and parallel plate capacitance. The overlap capacitance is due to overlap of the gate polysilicon over the edge of the drain region. This capacitance is relatively constant with the applied gate voltage $V_{SG}$. The parallel plate capacitance is the gate oxide capacitance, which is highly variable, depending on $V_{SG}$.

When $V_{SG} > |V_{TH}|$, the device is in the inversion region and the capacitance is dominated by the parallel plate capacitance (Cox). When $V_{SG} < |V_{TH}|$, the device is the depletion region and the capacitance is dominated by overlap capacitance.

Figure 14:
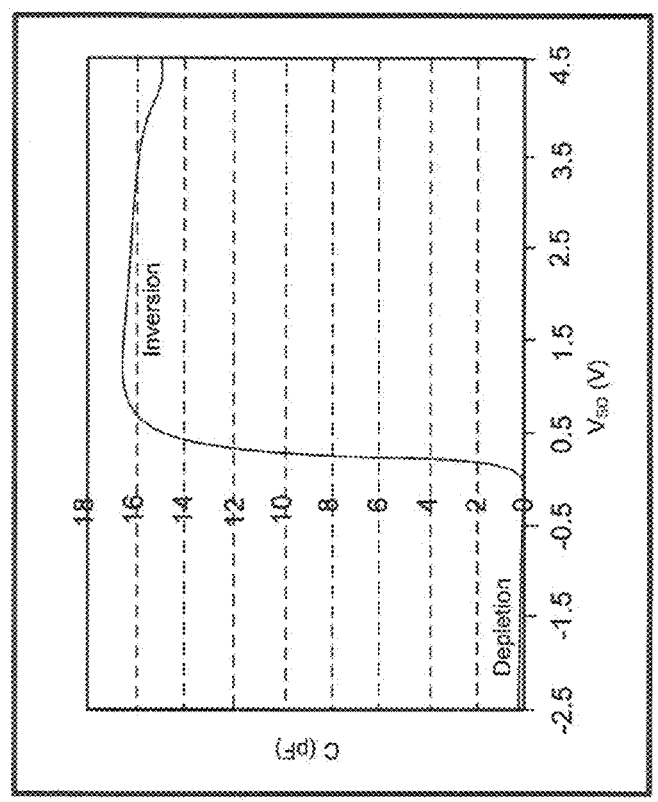
FIG. 14 is a graph depicting measured C-V characteristics of a transistor.

With the gate of the PMOS biased at 0.21V, for binary 0, $V_{SG}=-0.21V$; and for binary 1, $V_{SG}$ is well above $V_{TH}$. When the binary data input is switched from low to high, the capacitance changes distinctly, causing the shift in oscillation frequency. FIG. 14 depicts a graph of the measured C-V characteristic of a SOI PMOS transistor (W/L=120 µm/50 µm) at 500 kHz, such as can be obtained using a Keithley 590 C-V meter or like device.

Figure 10:
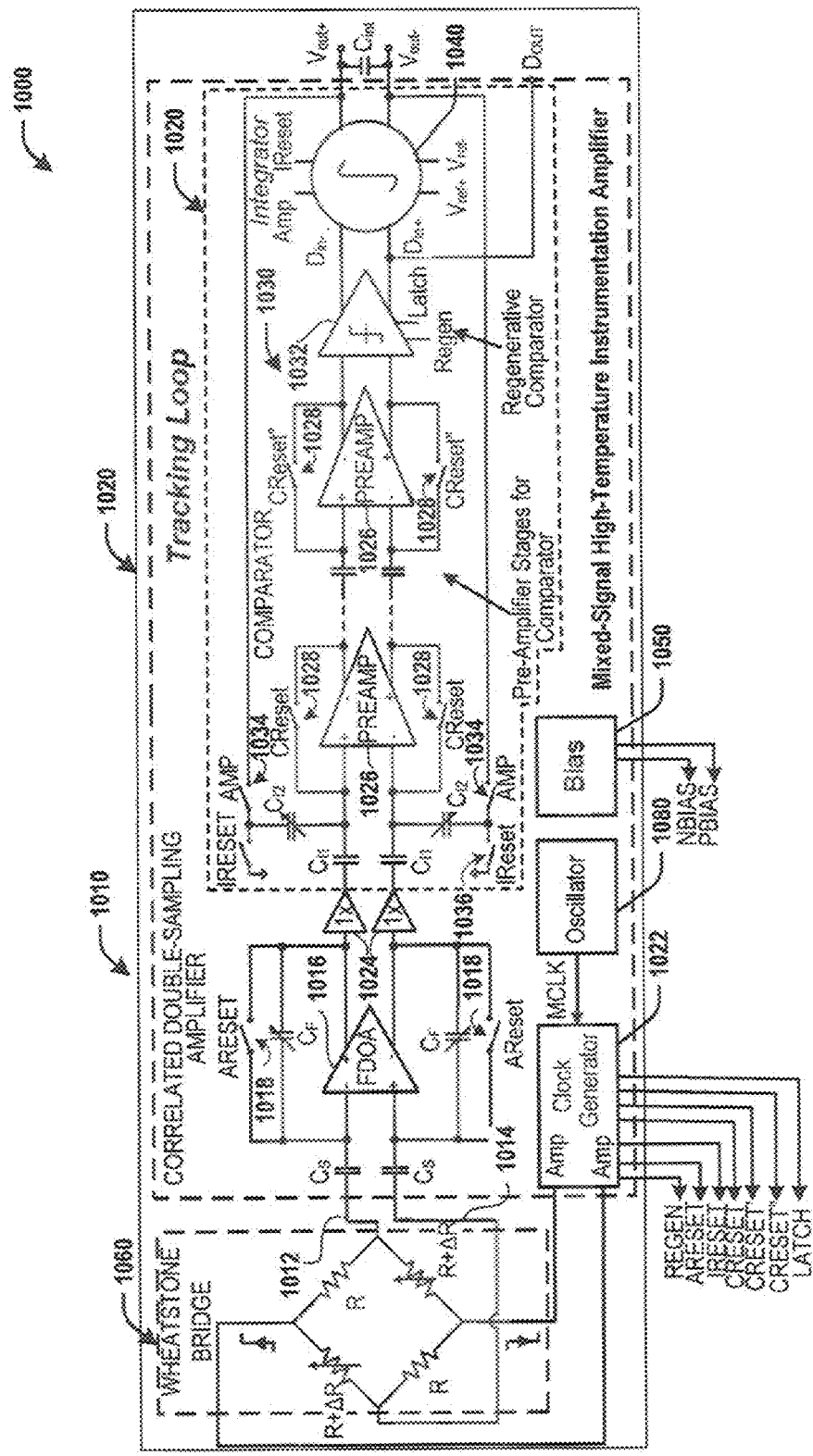
FIG. 10 is a schematic block diagram of a mixed-signal instrumentation amplifier using delta modulation to obtain filtered analog output.

FIG. 10 presents an illustration of a mixed-signal high-temperature SC (switched-capacitor) instrumentation amplifier 1000 that can be configured to provide an analog output, indicated as the voltages $V_{out+}$ and $V_{out-}$, a digital output, indicated at $D_{out}$, or it can provide both analog and digital outputs. The amplifier 1000 is shown as a fully differential amplifier that can be implemented as a single integrated circuit, such as according to CMOS processes. The fully differential topology used throughout the integrated circuit is relatively immune to many high temperature effects, including bulk junction leakage, and can provide solid performance at high temperatures (e.g., >300 C), ultimately limited by catastrophic loss of bias current to junction leakage.

The amplifier 1000 includes a correlated double sampling (CDS) amplifier 1010 at an input stage thereof. A mixed signal tracking loop 1020 includes a comparator 1030 and an integrator 1040 configured to perform delta modulation on the amplified input signal from the CDS amplifier 1010. As described herein, the tracking loop can be a switched capacitor implementation of a delta modulator. The input signal from the CDS amplifier 1010 is differenced with its predicted version, which is fed back from the output of the tracking loop. The resulting error signal is quantized at the sampling rate of $f_s$ to give a one-bit digital code $D_{in}$ (demonstrated as differential signal $D_{in-}$ and $D_{in+}$) which indicates the direction of rate of change of the input signal (e.g., corresponding to the derivative of the input signal). Thus by integrating the digital code $D_{in}$, a corresponding analog output signal $V_{out}$ (demonstrated as differential output $V_{out+}$ and $V_{out-}$).

The amplifier system 1000 further includes a constant-$g_m$ bias circuit 1050 that operates to stabilize $g_m$ over a range of temperatures. For instance, the bias generator 1050 can provide pbias and nbias signals for biasing p-type and n-type transistors circuitry that form the amplifier 1000. An example of a constant-$g_m$ bias circuit is shown and described herein with respect to FIG. 11B. As a result of the constant-$g_m$ biasing provided by the bias generator 1050, the amplifier 1000 can be fabricated from common CMOS processes and exhibit improved performance in harsh environments, including extreme variations in temperature.

In the example of FIG. 10, the CDS amplifier 1010 receives differential inputs 1012 and 1014 from a sensor 1060. The amplifier 1010 includes a fully differential operational amplifier (FDOA) 1016. For instance, the FDOA can be implemented as a conventional folded-cascode transconductance amplifier that is biased according to the substantially constant gm biasing (pbias and nbias) from the bias generator 1050. The inputs 1012 and 1014 from the sensor 1060 are coupled to respective inputs of the FDOA through input capacitors $C_S$. The CDS amplifier 1010 also includes feedback coupled between each respective input and output of the FDOA 1016.

In the example of FIG. 10, the differential CDS amplifier 1010 employs a switched capacitance (SC) common mode feedback (CMFB) circuit. The SC CMFB circuit includes a reset switch 1018 that is connected in parallel with a variable feedback capacitance $C_F$. For example, $C_F$ can be implemented as a bank of parallel capacitors having predetermined capacitance (e.g., about 0.3 pF each) that are selectively connected between the input and output of the FDOA by control logic (not shown) to set the capacitance $C_F$. The variable capacitor $C_F$ affords the amplifier a variable amount of gain that depends on the resulting capacitance $C_F$. During operation, the reset switches 1018 are controlled by an AReset signal that is provided by a clock generator 1022 to cancel offset from the amplifier 1010 using the technique of correlated double sampling. As described herein (see, e.g., FIG. 11D), the clock generator 1022 provides clock phases that control various switches during operation of the amplifier 1000.

The size and current for the input pair for the CDS amplifier 1010 can be selected based on the consideration of noise, which, referred to the track loop output, can be expressed as follows:

$$v_{on}^2 = 2 \times G_D^2 \times \left(\frac{C_F + C_S + C_{gs} + C_{gd} + C_P}{C_F}\right)^2 \times 2 \times \frac{\pi}{2} \times \frac{8kT}{3g_{m1,2}} \times B \quad \text{Eq.1}$$

where: $C_{gs}$ and $C_{gd}$ represent the small-signal capacitance of the input transistors, $C_P$ is the input parasitic capacitance, $g_{m1,2}$ is the transconductance of the input transistor of the FDOA 1016, B is the noise bandwidth set by the CDS amplifier bandwidth, The first factor of two is due to the differential pair, the second factor of two is due to folding of thermal noise, and $\pi/2$ is the leaky factor of a first order low-pass filter.

The CDS amplifier 1010 provides a programmable gain $G_A$ (e.g., of 6, 12, 24, or other value), which is set by the product of the ratio of $C_S/C_F$ (e.g., 3, 6 or 12) and a CDS gain of 2. The CDS gain of 2 in the example of FIG. 10 is 2 as the CDS amplifier 1010 amplifies the difference between the positive sensor signal and the negative sensor signal, which is double the sensor signal. Correlated double-sampling (CDS) can be performed at the amplifier 1010 via the AReset signal controlling the switches 1018. CDS operates to reduce the effect of offset, 1/f noise, charge injection, and KT/C noise. Those skilled in the art will understand other techniques and circuits that can be employed to provide for sampling of the inputs at 1012 and 1014 that mitigates noise and offset.

The outputs from the CDS amplifier 1010 drive the tracking loop 1020 through respective buffers 1024. The tracking loop includes a multi-stage comparator 1030 and an integrator 1040. The tracking loop 1020 also includes two pair of input capacitors $C_{I1}$ and $C_{I2}$. The tracking loop 1020 can be configured to provide an additional gain $G_D$ for the amplifier 1000, which can be set by the ratio of the input capacitors $C_{I1}/C_{I2}$ (e.g., set to 2, 4, 8 or other value). In the example of FIG. 10, the capacitors $C_{I2}$ are implemented as variable capacitors, such as a bank of parallel capacitors and switches that can be set by control logic (not shown) associated with the amplifier system 1000.

The tracking loop 1020 is implemented to convert the difference between the output from the CDS amplifier 1010 and the output of the integrator 1040 to a continuous-time differential analog output signal, demonstrated at $V_{out+}$ and $V_{out-}$, analogous to delta modulation. This difference can be amplified by the tracking loop 1020 with very low offset. Besides the analog output $V_{out+}$ and $V_{out-}$, the tracking loop 1020 also provides a digital output $D_{out}$ from its comparator 1030 that is proportional to the time derivative of the input. Since the signal is highly oversampled, the effect of the in-band thermal noise is also greatly reduced.

In the embodiment of FIG. 10, the comparator 1030 includes a plurality (e.g., two or three or more) cascaded offset-compensated pre-amplifier stages, indicated at 1026. The preamplifier stages 1026 amplify the differential input (corresponding to the difference between the output from the CDS amplifier and the output of the integrator 1040) and are configured to achieve required precision. The preamplifier stages 1024 can employ the same topology as the oscillator delay cell (see, e.g., FIG. 11C) that is employed to provide the oscillator 1080, but without the load capacitor. Each of the preamplifier stages 1026 are also biased by the constant-$g_m$ bias generator 1050 so that gain and bandwidth of the tracking loop can be maintained over temperature. As part of the switched capacitance topology of the tracking loop 1020, each of the preamplifier stages 1026, includes a switch 1028 coupled between the input and output thereof. Each of the switches 1028 is controlled by a respective comparator sample reset signal CReset.

In one embodiment, the comparator 1030 includes three preamplifier stages 1026, each controlled by a respective comparator sample reset signal, such as can correspond to a clock phase signal CReset, CReset' and CReset" provided by the clock generator. For example, the reset switches 1028 are initially closed, then sequentially opened, first to last, according to the CReset, CReset' and CReset" signals to amplify this difference with very low offset. Each of the CReset, CReset' and CReset" signals can be provided as a delayed version of the previous signal; namely, CReset' is a delayed version of CReset and CReset" is a further delayed version of CReset', such as shown with respect to FIG. 11D.

The preamplifier stages 1026 provide the comparator output signal to a regenerative comparator 1032. The regenerative comparator 1032 latches the comparator output signal of the preamplifier stages to drive the integrator 1040 positively or negatively in an effort to track the amplified sensor signal. For instance, the regenerative comparator 1032 provides a pair of digital outputs $D_{in-}$ and $D_{in+}$ to the integrator 1040 of the tracking loop 1020. The digital output $D_{in-}$ and $D_{in+}$ is proportional to the time derivative of the input, the sampled signal provided at 1012 and 1014.

The integrator 1040 can be configured to perform 1-bit digital-to-analog (DAC) conversion and low-gain integration to obtain the correct trade-off between sample rate and resolution. The low-gain integrator requires large, off-chip capacitance $C_{int}$. As an example, the integrator 1040 could be implemented using a 1-bit IDAC, but a mismatch or instability between reference current and integration capacitor could affect resolution. The integrator 1040 can be implemented as a SC integrator that is biased by the constant-gm bias generator 1050. The differential outputs of the integrator 1040 are fed back to the input of the tracking loop 1020 via switches 1034.

The switches 1034 are coupled to respective inputs of the first preamplifier stage through the variable capacitors $C_{I2}$. The switches 1034 are controlled by an AMP signal, which can be provided as a clock phase by the clock generator 1022, which can be the same AMP signal that is provided to activate the sensor 1060. The node interconnecting each $C_{I2}$ and respective switch 1034 is also selectively connectable to a reference voltage, depicted as ground, through a corresponding reset switch 1036. Each reset switch 1036 can be controlled by an IReset signal that is provided by the clock generator 1022. The respective switches 1034 and 1036 can thus be controlled to operate substantially out-of-phase from each other to facilitate charging of the capacitors $C_{I2}$ based on the integrator output signals during sampling and discharging thereof before the next sampling cycle. In this way the tracking loop 1020 can provide an effective switched capacitor implementation of a delta modulator.

Figure 11A:
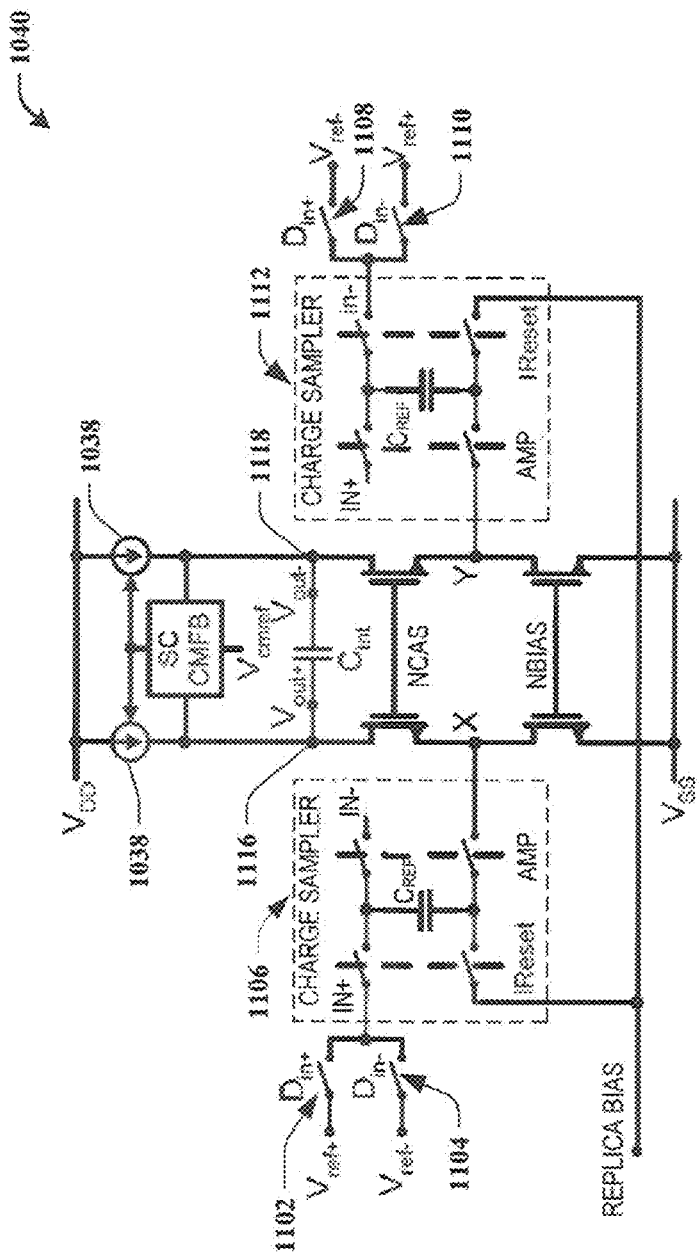
FIG. 11A is a transistor level circuit schematic of a fully differential integrator with continuous-time output using just one integration capacitor.

By way of further example, FIG. 11A illustrates the integrator 1040 as a fully-differential SC integrator. It will be appreciated by those skilled in the art that the circuit arrangement of the integrator of FIG. 11A enables a reduction in off-chip components. For instance, the integrator 1040 can be implemented with a single off-chip capacitor $C_{int}$. The integrator 1040 is connected between voltage rails, depicted as positive and negative rails $V_{DD}$ and $V_{SS}$. The integrator 1040 employs SC CMFB circuit that controls current references 1038 based on a common mode reference voltage Vcmref and the respective output voltage signals $V_{out+}$ and $V_{out-}$. The integration capacitor $C_{int}$ is connected between outputs 1116 and 1118 of the integrator 1040, which correspond to the output voltages $V_{out+}$ and $V_{out-}$.

The digital outputs $D_{in+}$ and $D_{in-}$ from the regenerative comparator drive the integrator 1040 by controlling activation and deactivation of switches 1102 and 1104 that are coupled to respective positive and negative reference voltages $V_{ref+}$ and $V_{ref-}$. The switches 1102 and 1104 are coupled to a virtual ground node X through a charge sampler circuit 1106. Similarly, the digital outputs $D_{in+}$ and $D_{in-}$ control of switches 1108 and 1110 that are coupled to the respective negative and positive reference voltages $V_{ref-}$ and $V_{ref+}$. The switches 1108 and 1110 are coupled to another virtual ground node Y via another charge sampler 1112. Each of the charge sampler circuits includes switches coupled to a reference capacitor $C_{ref}$ in an H-bridge arrangement. The switches are controlled according to the clock phases IReset and AMP provided by the clock generator 1022 (see, e.g., FIGS. 10 and 11D). The charge sampler circuits 1106 and 1112 thus inject charge into virtual ground nodes X and Y for each clock cycle according to digital outputs $D_{in+}$ and $D_{in-}$.

In the example of FIG. 11A, the charge injected at the nodes X and Y is transferred to the integration capacitor $C_{int}$ through a pair of cascode NMOS devices, which are connected between outputs 1116 and 1118 and the nodes X and Y to provide the respective output voltage signals $V_{out+}$ and $V_{out-}$. The cascode NMOS devices are gated by a bias signal ncas, which is provided by the bias generator 1050 (FIG. 10). Another pair of cascode NMOS devices, which are biased by nbias (also provided by the bias generator 1050), couple the nodes X and Y to a low voltage rail $V_{SS}$. A Replica bias signal is provided to the nodes X and Y through the charge sampler circuits 1106 and 1112. The Replica bias is set (e.g., by the bias generator 1050 or other associated circuitry) to match each of voltage at X and Y to a desired voltage level, which in one embodiment is the same for each node. The integration capacitor $C_{int}$ mitigates the need for precise current reference for the integrator 1040. Settling time of the pedestal is decided by the transconductance of NMOS cascode devices. The magnitude of injected charge difference on X and Y is:

$$C_{REF}(V_{ref+} - V_{ref-}) \qquad \text{Eq. 2}$$

and its polarity depends on the comparator output $D_{in}$. Accordingly, the quantization step on the differential output of the integrator can be expressed as follows:

$$C_{ref}(V_{ref+} - V_{ref-})/C_{int} \qquad \text{Eq. 3}$$

This value for the quantization step is stable over temperature since both the capacitor ratio and reference voltage have excellent temperature stability due to the substantially constant gm-biasing provided by the bias generator 1050.

Figure 11B:
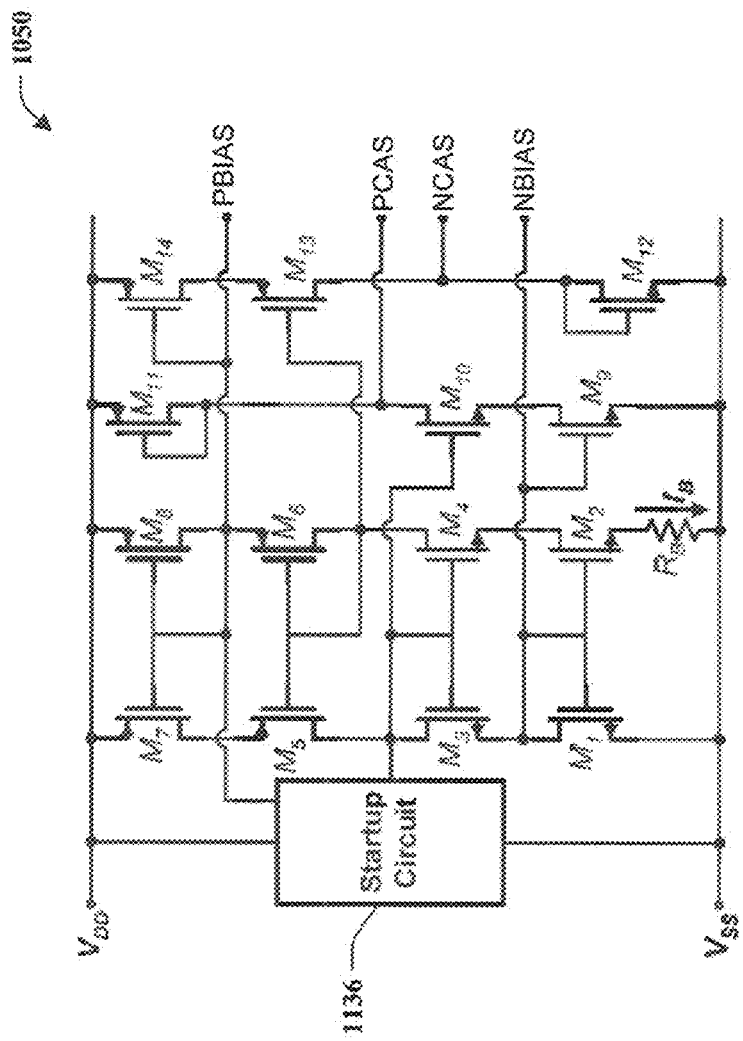
FIG. 11B is a transistor level circuit schematic of a bias circuit that enables temperature adaptive biasing.

FIG. 11B depicts an example circuit implementation of the adaptive bias generator 1050 introduced with respect to FIG. 10. The bias generator 1050 is connected between voltage rails $V_{DD}$ and $V_{SS}$ and provides a plurality of bias voltages pbias, pcas, ncas and nbias. The bias generator 1050 is configured to generate a bias current $I_B$ with a temperature dependence that is inversely proportional to that of mobility ($\mu$). Since the transconductance is proportional to mobility times current (e.g., gm~$\mu$/I), the bias generator 1050 generates the respective bias voltages with substantially constant gm over temperature.

In the example of FIG. 11B, the bias generator 1050 of FIG. 11B includes a constant-gm biasing circuit 1132 that provides pbias and nbias voltages. The bias generator 1050 also includes a cascode bias generator circuit 1134, which generates cascode bias signals ncas and pcas based on the nbias and pbias signals.

The bias generator 1050 includes a start-up circuit 1136 that is utilized to supply initial voltages to an arrangement of current mirrors that mirror the bias current $I_B$ to provide bias. A first current mirror is formed by transistors $M_7$, $M_8$, M5, and $M_6$. A second current mirror is formed by transistors $M_1$, $M_2$, $M_3$, $M_4$ and $R_B$. This second current mirror of $M_1$, $M_2$, $M_3$, $M_4$ and $R_B$ is configured with a non-linear characteristic to obtain a desired bias current $I_B$ that is proportional to $1/\mu$. In this configuration of constant gm bias generator 1050, the nbias corresponds to the voltage at the common gates of $M_1$ and $M_2$, which is coupled to the source of M3 in the current mirror configuration. Similarly, pbias corresponds to the voltage at the common gates of $M_7$ and $M_8$, which is coupled to the source of $M_6$ of the current mirror configuration. The current mirrors are arranged in a feedback relationship to stabilize the bias current $I_B$ during normal operation. During operation, the current mirror formed by transistors $M_7$, $M_8$, M5, and $M_6$ cause the current through $M_1$ to be equal to the bias current $I_B$ through $M_2$.

As a further example, the transconductance of a transistor $M_2$ biased by the current $I_B$ has a temperature dependence proportional to $1/R_B$. For instance, assuming matched transistors, and neglecting channel length modulation and the backgate effect on threshold voltage, the bias current $I_B$ through the resistor $R_B$ can be expressed as follows:

$$I_B = \frac{2}{\mu_n C_{ox} R_B^2}\left(\sqrt{\frac{L_1}{W_1}} - \sqrt{\frac{L_2}{W_2}}\right)^2 \quad \text{Eq. 4}$$

where W and L are the channel width and length of the transistors $M_1$ and $M_2$, $R_B$ is the resistance, $\mu_n$ is the mobility, $C_{ox}$ is the capacitance of the oxide layer of the transistors.

It will be appreciated that in Eq. 4, $\mu_n$ and $R_B$ are the primary sources of temperature dependence. As temperature increases, the constant-$g_m$ bias circuit 1050 will compensate for degraded mobility. In other words, the slew rate increases over temperature. Therefore, slew rate is not an issue at high temperature (e.g., >300 C).

From Eq. 4, it can be further shown that the transconductance is proportional to $R_B$, which can be expressed as follows:

$$g_m \propto \frac{1}{R_B\left(1 + \frac{\gamma_n}{2\sqrt{2\phi_F}}\right)} \quad \text{Eq. 5}$$

where $R_B$ is the resistance of the biasing resistor;

$\gamma_n$=the body-effect constant;

$\phi_F$=is the Fermi potential of the bulk, which is;

$$\phi_F = \frac{kT}{q}\ln\left(\frac{N_B}{n_i}\right),$$

where $N_B$ is the bulk doping level.

Eq. 5 demonstrates that the backgate effect tends to make the temperature coefficient of gm negative. Such an effect could be avoided by connecting source to body of the cascode transistor; although this generally cannot be done in a standard bulk CMOS process.

In practice, the bias current should be sufficiently large to minimize the leakage current effect on bias. As one example, it is assumed that $I_B$=9 $\mu$A at 300 K can be selected. In a situation where $M_2$ is twice the size of $M_1$, then $R_B$ can be 11.9 k$\Omega$ according to the Eq. 4, solved for $I_B$, with $\phi_F$=0.35 V. Simulation using SPICE can be performed to show that $R_B$ in this example would be 8.6 k$\Omega$ to obtain the desired current. The difference between hand calculation and SPICE is due to the neglected second order effects, such as channel length modulation.

The square-law model predicts that the transconductance $g_m$ of a transistor biased with this current is simply proportional to $1/R_B$. As one example, substantially temperature resistant resistors formed of alloys such as nichrome, sichrome, nickel or other alloys can be used to provide $R_B$. As another example, the resistor $R_B$ can be implemented as a polyl biasing resistor having a rated temperature coefficient (TC) of about 1000 ppm/° C. with acceptable performance. Thus, those skilled in the art will appreciate various types of resistors that can be implemented for $R_B$ for providing the bias current therethrough to achieve the substantially constant gm biasing for the bias generator 1050. Due to interactions between linear and non-linear (slewing) behavior in the bias generator 1050, very stable results at high temperatures (e.g., >300 C) can be achieved even when the bias generator 1050 and the other portions of the amplifier circuitry 1000 (FIG. 10) are fabricated using a conventional bulk CMOS IC processes.

Figure 11C:
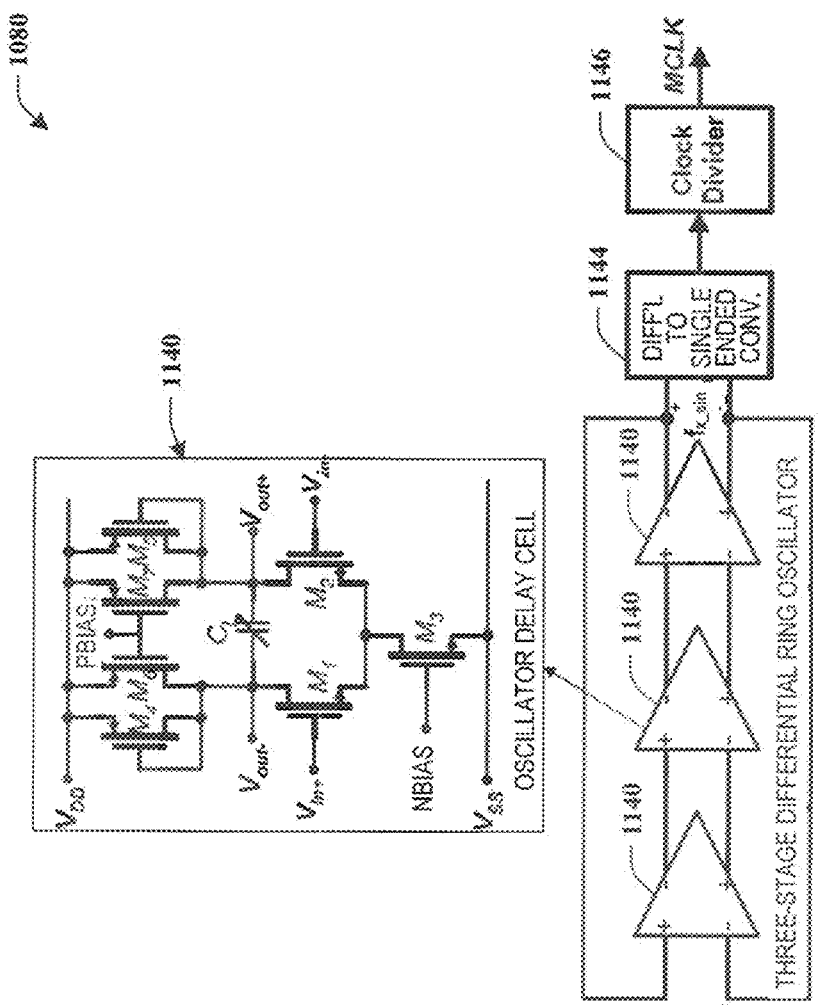
FIG. 11C is a schematic diagram of an oscillator that uses temperature adaptive biasing to obtain stable oscillation frequency over wide temperature variations.

As illustrated in FIG. 11C, a fully-integrated oscillator 1080 that can be utilized to provide the clock signal MCLK in FIG. 10 is detailed. The oscillator circuit 1080 employs a three-stage differential ring in which the gain of each stage, which should be $\geq 2$ to satisfy the oscillation criterion, is set by the ratio $g_{m1,2}/g_{m4,5}$, both of which are temperature stabilized. The oscillation frequency is proportional to $g_{m4,5}/C_L$, which is stabilized by the constant-$g_m$ biasing scheme. The differential pair in each stage can be implemented as a scaled down replica of the differential pair in the amplifiers in the instrumentation amplifier, such that the oscillator frequency $f_{osc}$ is proportional to the gain bandwidth (GBW) of those amplifiers, which in turn corresponds to the settling speed of the amplifier. Therefore, the settling time of the main amplifiers is locked to the oscillator frequency, and the oscillation frequency is stabilized by the constant-$g_m$ biasing scheme described herein. In other words, accurate settling is maintained over a wide temperature range, and sampling rate, which sets resolution and/or throughout rate in an ADC or cutoff frequency in an SC filter, is also stabilized.

An enlarged example implementation of each of the delay cell stages is depicted at 1140. The delay cell 1140 includes a differential input Vin+ and Vin− at the gates of transistors M1 and M2. A variable capacitor C1 is coupled between the drains of M1 and M2 to provide corresponding outputs Vout− and Vout+. The delay cell is biased by applying the bias nbias to the gate of transistor M3, which is connected between the common source of M1 and M2 and a low voltage rail $V_{SS}$. Transistors M4, M5, M6 and M7 are coupled between the respective drains of M1 and M2 and a high voltage rail $V_{DD}$. The common gate of M6 and M7 are biased by pbias according to the difference between $V_{DD}$ and pbias. The output of the three-stage differential ring oscillator is converted to a single voltage by a converter 1144. A clock divider circuit 1146 divides the resulting output to the corresponding clock signal MCLK having the desired frequency.

Figure 11D:
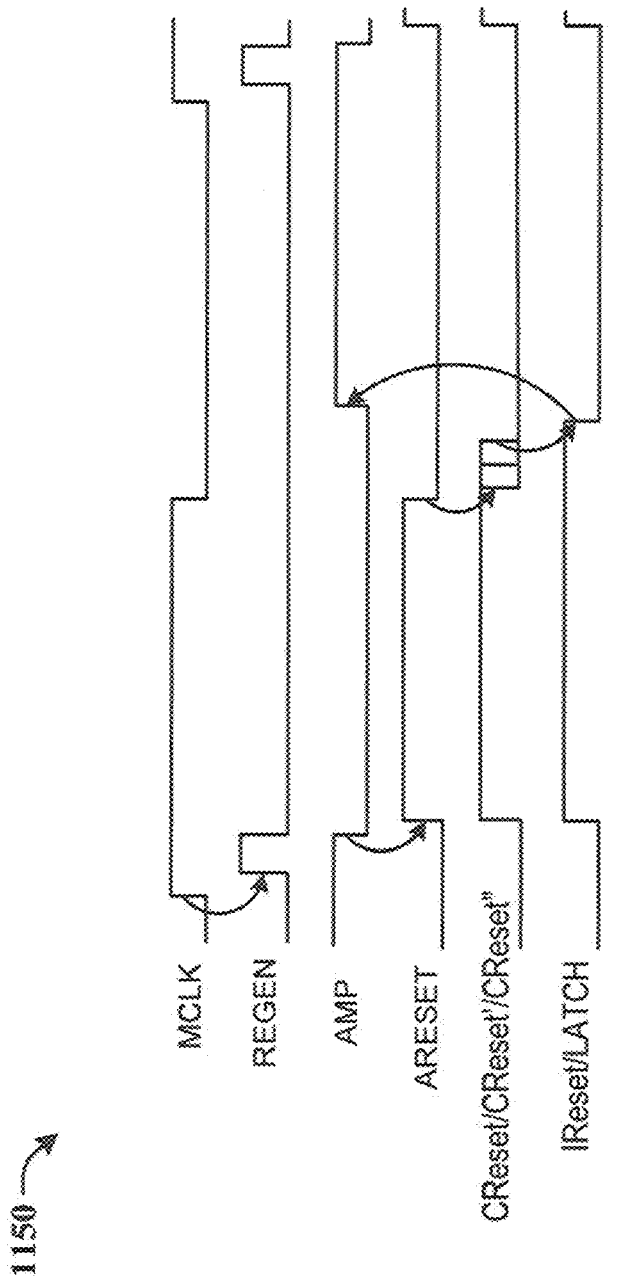
FIG. 11D is an example timing diagram of various clock phases provided by the clock generator of FIG. 10.

FIG. 11D depicts an example of a timing diagram 1150 for various signals generated by the clock generator of FIG. 10 and which are utilized in FIGS. 10 and 11A. As shown and described with respect to FIG. 10, the signals represent internal clock phases that are designed to control switches for operation of the amplifier 1000 and related circuitry. The bias generator 1050 provides bias signals for biasing transistors of the clock generator so that the timing of the switches adapt to environmental effects, such as temperature.

As depicted in FIG. 11D, the clock signal MCLK is the main clock signal provided by the oscillator of FIG. 11C. The rising edge of MCLK triggers a REGEN signal pulse. The REGEN pulse causes an AMP signal to go low for controlling operation of the input amplifier 1010. The AMP signal triggers an ARREST signal to go high as well as the sequential comparator reset signals CReset/CReset'/CReset". That is when the ARESET signal goes low, the comparator reset signals CReset/CReset'/CReset" sequentially go low to close respective switches 1028 in the comparator 1030 to propagate the sampled signal through the tracking loop 1020. This signal further triggers the IReset and Latch signals to go low such that the output from the regenerative comparator 1032 drives the integrator to provide corresponding output voltages Vout+ and Vout− across the output capacitor Cint.

Figure 12:
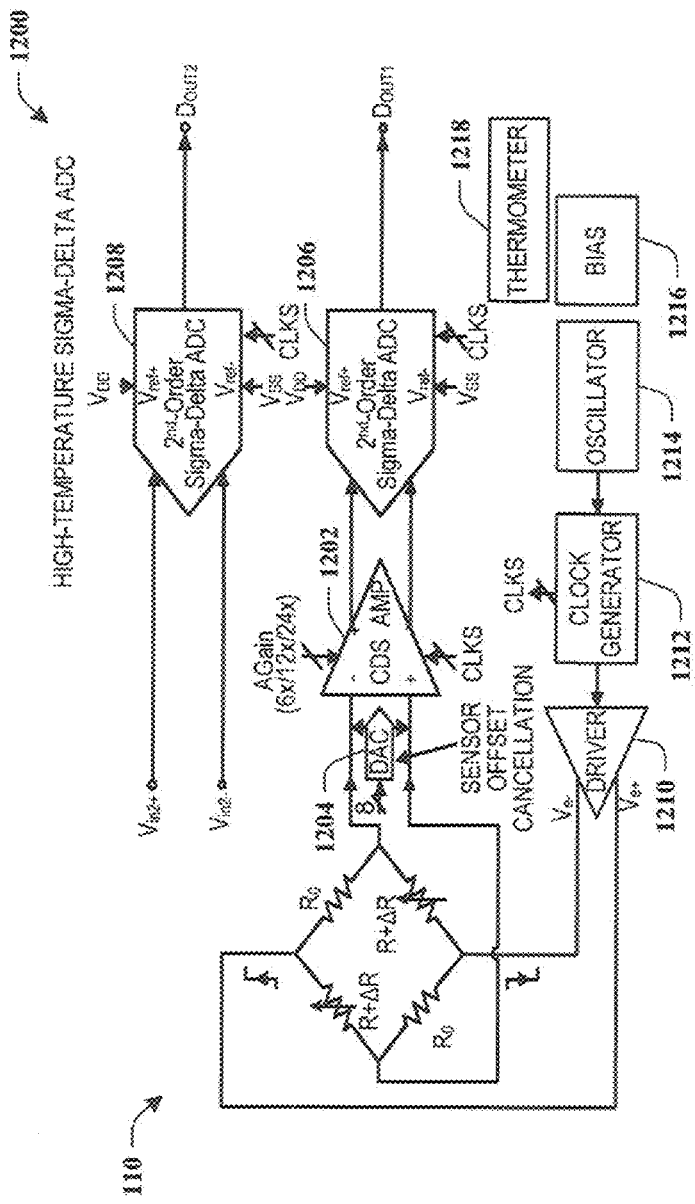
FIG. 12 is a schematic block diagram of an integrated circuit with double-sampled instrumentation amplifier and $2^{nd}$-order sigma-delta A/D converter.

FIG. 12 presents an illustration of $2^{nd}$-order sigma-delta modulator ADCs 1206 and 1208 that can be implemented in an integrated circuit 1200. For example, each $2^{nd}$-order sigma-delta modulator 1206, 1208 can be implemented as a bulk CMOS, switched-capacitor $2^{nd}$-order sigma-delta modulator. The modulator uses correlated double sampling, constant $g_m$ biasing, and a modulator architecture with coefficients adjusted to improve temperature stability. The integrated circuit includes a preamplifier 1202 that is configured to interface to the sensor 110 through corresponding connector terminals. The preamplifier 1202 can be implemented as a CDS pre-amplifier 1202 that has an adjustable gain GA, such as can be a gain of 6×/12×/24×. Digitally-programmable sensor offset correction can be provided via a DAC 1204, such as provide offset correction with 13 dB dynamic range and 9 dB resolution.

In the example implementation of FIG. 12, there are two instances of the 2nd-order sigma-delta modulator, indicated at 1206 and 1208. A first sigma-delta modulator 1206 is connected with the CDS pre-amplifier to interface with the sensor and is thus configured to provide a corresponding digital output Dout1 according to the input provided by the sensor 110. Similar to the example of FIG. 10, supporting circuits include a sensor driver 1210, clock generator 1212, an oscillator 1214, and a constant-gm bias circuit 1216. Such circuitry can be integrated to provide a single-chip solution for sensor interfacing. The integrated circuit can also include a thermometer 1218. In one example, the thermometer can provide an analog output voltage that can be selectively connected as an input the CDS amplifier 1202, which is converted to a corresponding digital output by the circuit 1200. It will be appreciated that the circuit 1200 can be implemented with only one off-chip capacitor for power supply by-pass. The sensor output and modulator reference are both scaled by the power supply $V_{DD}$, so the converter output is independent of supply voltage.

The fully differential topology used throughout the integrated circuit is relatively immune to many high temperature effects, including bulk junction leakage, but is ultimately limited by catastrophic loss of bias current to junction leakage. In an n-well process, PMOS transistors have much less leakage current at high temperature than do NMOS. Thus, PMOS switches can be used at critical nodes of the SC circuitry to reduce errors caused by leakage. Dynamic logic is avoided in the digital circuits.

Precise transient behavior of any SC circuits is unimportant providing that charge is conserved and the circuitry is fully settled at the end of each clock cycle. Thus, accuracy depends primarily on capacitor ratios and the ratio of clock frequency $f_{osc}$ to op-amp gain bandwidth (GBW). Capacitor ratios have very weak temperature dependence. As described with respect to FIGS. 10 and 11B, constant $g_m$ bias circuit is used to stabilize transconductance for the circuit 1200 over temperature. Additionally, the amplifier 1202 can be implemented as a finite-gain-compensated CDS pre-amplifier to remove low-frequency noise and finite amplifier gain error by way of double sampling, effectively squaring the open-loop gain of the operational amplifier. Since the temperature stability of the fully-differential operational amplifier affects performance of the pre-amplifier and modulator, a folded cascade topology may be used, so that transconductance is stabilized over temperature similar to as discussed with respect to FIG. 10.

Figure 13A:
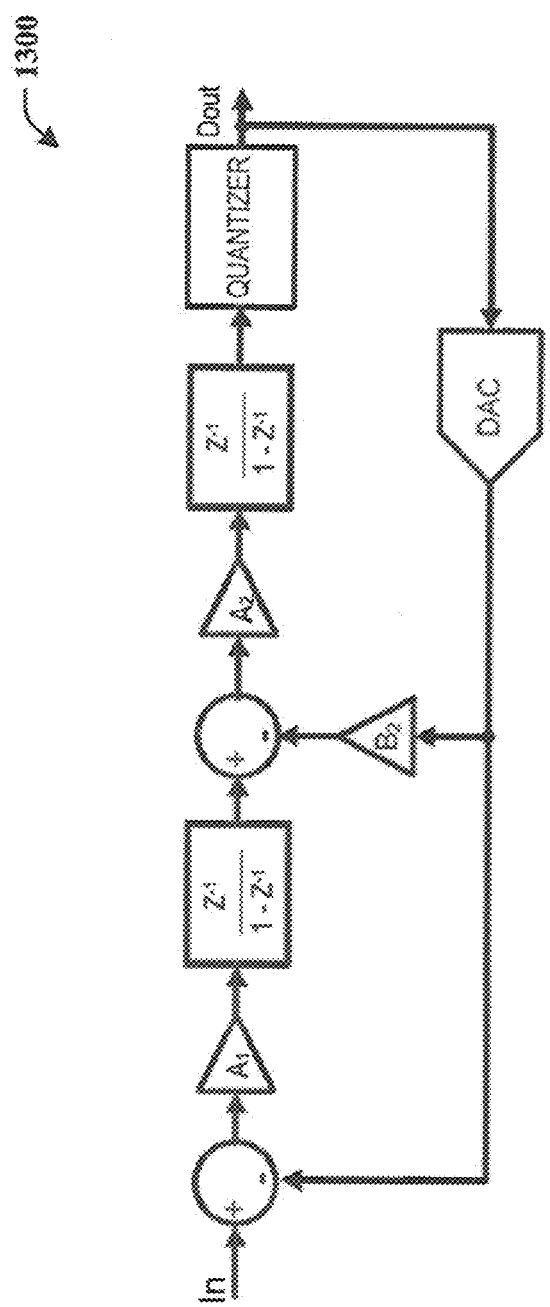
FIG. 13A illustrates a discrete-time model of a $2^{nd}$-order sigma-delta modulator.

FIG. 13A illustrates a block diagram of a 2nd-order sigma-delta modulator 1300 that provides improved resolution, as compared to the $1^{st}$-order modulator. Integrator output swing limits the modulator dynamic range. As temperature increases, the output swing of the integrators is reduced by the constant-$g_m$ biasing provided by the bias generator 1216. As a result, modulator parameters are reduced to lower the signal range of the first-stage integrator, and thereby avoid (or at least significantly reduce) integrator nonlinearity.

Figure 13B:
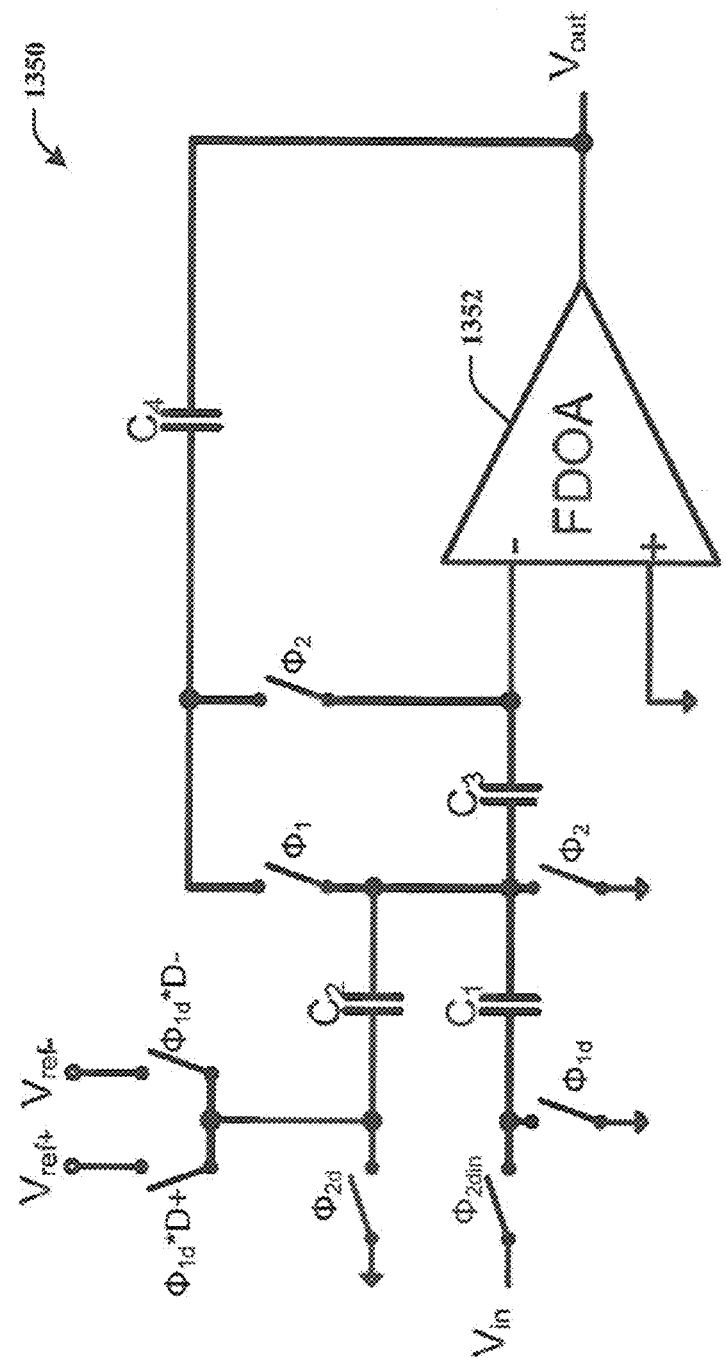
FIG. 13B is a schematic block diagram of a switched-capacitor integrator with finite-gain compensation.

FIG. 13B depicts an example of a first stage integrator 1350 that can form part of the sigma-delta ADC. The first stage integrator can be implemented as a switched capacitance (SC) correlated double sampling (CDS) integrator. In FIG. 13B, a single ended version of the integrator is shown as to provide Vout by integrating the input Vin. In the example of FIG. 13B, the SC CDS includes a FDOA 1352, such as described herein. Thus, it will be understood that a fully differential version can also be utilized as to provide a differential output as a function of a differential input. The input $V_{in}$ is provided to the SC CDS integrator 1350 through an input sampling switch. The various switches in the SC CDS integrator 1350 are controlled by clock signals provided by the clock generator 1212 (example clock phases are shown in the timing diagram of FIG. 13C). The $\phi_{2in}$ clock phase used by the input sampling switch is designed to be turned off one half unit delay ahead of $\phi_{2d}$ to avoid a glitch at the preamplifier output at the end of $\phi_{2d}$. $\phi_{1d}$ and $\phi_{2d}$ correspond to delayed turn-off versions of clock phases $\phi_1$ and $\phi_2$. $V_{DD}$ and $V_{SS}$ can be used for $V_{ref+}$ and $V_{ref-}$. Each of the switches associated with the reference voltages $V_{ref+}$ and $V_{ref-}$ are maintained out of phase with respect to each other, such as by multiplying the respective switch control signal $\phi_{1d}$ by out-of-phase signals D+ and D−.

In the example of FIG. 13B, the reference and input signals of the SC CDS integrator 1350 use different input capacitors C1 and C2, respectively, instead of sharing the same capacitor. This provides at least two advantages. First, it permits reference scaling, so $V_{DD}$ and $V_{SS}$ can be used for $V_{ref+}$ and $V_{ref-}$, while choosing $C_2=C_1/2$ sets the maximum modulator differential input range to $\pm V_{DD}/2$. Second, capacitor sharing can cause harmonic distortion since the current drawn from the reference is signal-dependent. C3 and C4 are selected to provide for corresponding integration of the input signal $V_{in}$ according to operation of the switches controlled by $\phi_1$ and $\phi_2$.

FIG. 13C demonstrates a timing diagram or clock signals that can be utilized to operate the sigma-delta ADCs 1206 and 1208 of FIG. 12 and, in particular the first stage SC CDS integrator thereof shown in FIG. 13 B. The operation of the delta sigma modulator and the CDS integrator are controlled by clock phases similar to the amplifier of FIG. 10. The clock generator 1212 generates the clock signal MCLK that provides a timing reference for the circuit 1200. A rising edge of MCLK triggers a REGEN pulse. The falling edge of REGEN triggers the sequence of $\phi_2/\phi_{2in}/\phi_{2d}$, which in turn triggers clock phases ($\phi_{1ee}/\phi_{1e}/\phi_1/\phi_{1d}$. The clock phase $\phi_{1d}$ operates to re-assert clock phases $\phi_2/\phi_{2in}/\phi_{2d}$. A LATCH signal is employed to latch the output of the $D_{out}$, such as can be latched through one or more D-type flip-flops.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An amplifier system comprising:
   an input amplifier configured to receive an analog input signal and provide an amplified signal corresponding to the analog input signal;
   a tracking loop configured to employ delta modulation for tracking the amplified signal, the tracking loop providing a corresponding output signal; and
   a biasing circuit configured to adjust a bias current to maintain stable transconductance over temperature variations, the biasing circuit providing at least one bias signal for biasing at least one of the input amplifier and the tracking loop, whereby circuitry receiving the at least one bias signal exhibits stable performance over the temperature variations.

2. The system of claim 1, wherein the analog input signal is a differential input signal, the input amplifier being configured to receive the differential input signal.

3. The system of claim 2, wherein the input amplifier comprises a correlated double sampling amplifier that is biased by the at least one bias signal, the correlated double sampling amplifier providing an amplified differential output to the tracking loop.

4. The system of claim 3, wherein the correlated double sampling amplifier further comprises a fully differential operational amplifier that is biased by the at least one bias signal.

5. The system of claim 3, wherein the correlated double sampling amplifier employs a switched capacitance common mode feedback circuit.

6. The system of claim 1, wherein the tracking loop comprises a switched capacitor implementation of a delta modulator, the tracking loop being biased by the at least one bias signal.

7. The system of claim 1, wherein the tracking loop further comprises:
   a comparator that receives the amplified signal and differences the amplified signal with a predicted version of the input signal that is fed back from the corresponding output signal provided by the tracking loop;
   a regenerative comparator configured to quantize a difference between the amplified signal and the predicted version of the input signal to provide a digital representation of the corresponding output signal that is proportional to a derivative of the corresponding output signal; and
   an integrator that integrates the digital representation of the corresponding output signal to provide the corresponding output signal.

8. The system of claim 7, wherein the comparator comprises a multi-stage comparator, each stage of the multi-stage comparator being biased by the at least one bias signal.

9. The system of claim 7, wherein the integrator further comprises a fully differential on-chip integrator, the comparator and the input amplifier being integrated on-chip with the integrator.

10. The system of claim 9, further comprising a single off-chip capacitor connected between outputs of the integrator to provide the corresponding output signal across the single off-chip capacitor.

11. The system of claim 1, further comprising a clock generator configured to provide clock phases for controlling operation of at least the input amplifier and the tracking loop, the clock generator being biased by the at least one bias signal.

12. The system of claim 1, wherein the biasing circuit further comprises a first current mirror portion and a second current mirror portion, the second current mirror portion including an arrangement of transistors and a resistor the second current mirror portion being configured with a non-linear characteristic to provide the bias current through the resistor, the at least one bias signal corresponding to a bias voltage from at least one of the first current mirror portion and the second current mirror portion.

13. The system of claim 12, wherein the bias current through the resistor is inversely proportional to mobility through at least one of the transistors of the second current mirror portion.

14. The system of claim 13, wherein the first current mirror portion is connected with the second current mirror portion between first and second voltage references and being arranged in a feedback relationship to stabilize the bias current through the resistor.

15. The system of claim 1, wherein the tracking loop comprises at least one second order sigma-delta modulator configured to provide the corresponding output signal as a digital representation of the input signal, the at least one second order-sigma delta modulator being biased by the at least one bias signal.

16. An integrated circuit comprising:
   an input amplifier configured to receive an analog input signal and provide an amplified signal corresponding to the analog input signal;

a tracking loop configured to employ delta modulation for tracking the amplified signal, the tracking loop providing a corresponding output signal; and a bias generator for providing adaptive bias control that provides stabilization of transconductance over temperature for associated circuitry, the circuitry comprising:

a first arrangement of transistors configured as a first current mirror portion, the first current mirror portion being connected to a first reference voltage; and a second arrangement of transistors and a resistor configured as a second current mirror portion having a non-linear characteristic to provide a bias current through the resistor that is inversely proportional to mobility, the first current mirror portion being connected with the second current mirror portion between the first reference voltage and a second reference voltage and being arranged in a feedback relationship to stabilize the bias current through the resistor, a bias voltage being provided from at least one of the first current mirror portion and the second current mirror portion based on the bias current, wherein each of the input amplifier and the tracking loop is biased by the bias voltage generated by the bias generator.

17. The bias generator of claim 16, wherein the bias current through the resistor is inversely proportional to mobility through at least one of the transistors of the second current mirror portion.

18. The bias generator of claim 16, wherein the first arrangement of transistors comprises p-type field effect transistors, a pbias voltage corresponding to a drain voltage of a diode-connected one of the transistors in the first arrangement of transistors, wherein the second arrangement of transistors comprises n-type filed effect transistors, an nbias voltage corresponding to a drain voltage of a diode-connected one of the transistors in the second arrangement of transistors, and the bias current being adjusted as a function of temperature to vary each of the pbias and nbias voltages to maintain stable transconductance over a range of temperatures.

19. The integrated circuit of claim 16, wherein the tracking loop further comprises:

a comparator that receives the amplified signal and differences the amplified signal with a predicted version of the input signal fed back from the corresponding output signal provided by the tracking loop;

a regenerative comparator configured to quantize the difference between the amplified signal and the predicted version of the input signal to provide a digital representation of the corresponding output signal that is proportional to a derivative of the corresponding output signal; and an integrator that integrates the digital representation to provide the corresponding output signal, the comparator, the regenerative comparator and the integrator being biased by the bias voltage.

* * * * *